US012490305B2

(12) United States Patent
Lou et al.

(10) Patent No.: US 12,490,305 B2
(45) Date of Patent: Dec. 2, 2025

(54) EVENT PROCESSING METHOD AND APPARATUS

(71) Applicant: Huawei Technologies Co., Ltd., Shenzhen (CN)

(72) Inventors: Chong Lou, Shanghai (CN); Qufang Huang, Shenzhen (CN); Xiaoying Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 331 days.

(21) Appl. No.: 17/740,036

(22) Filed: May 9, 2022

(65) Prior Publication Data

US 2022/0264651 A1 Aug. 18, 2022

Related U.S. Application Data

(63) Continuation of application No. PCT/CN2019/116504, filed on Nov. 8, 2019.

(51) Int. Cl.
*H04W 74/08* (2024.01)
*H04L 1/1607* (2023.01)
(Continued)

(52) U.S. Cl.
CPC ....... *H04W 74/0816* (2013.01); *H04L 1/1614* (2013.01); *H04W 72/23* (2023.01); *H04W 74/004* (2013.01); *H04W 80/02* (2013.01)

(58) Field of Classification Search
CPC .... H04L 1/1614; H04W 16/14; H04W 72/23; H04W 74/004; H04W 74/0808; H04W 74/0816; H04W 76/18; H04W 80/02
(Continued)

(56) References Cited

U.S. PATENT DOCUMENTS

2011/0255492 A1  10/2011  Dai et al.
2018/0124831 A1  5/2018  Dinan
(Continued)

FOREIGN PATENT DOCUMENTS

CN    101795497 A    8/2010
CN    105611637 A    5/2016
(Continued)

OTHER PUBLICATIONS

"List of open issues on NR MAC," 3GPP TSG-RAN WG2 Meeting #101bis, Sanya, China, R2-1804571, Total 34 pages, 3rd Generation Partnership Project, Valbonne, France (Apr. 16-20, 2018).
(Continued)

*Primary Examiner* — Robert J Lopata
(74) *Attorney, Agent, or Firm* — Leydig, Voit & Mayer, Ltd.

(57) ABSTRACT

This application relates to the communications field, and discloses an event processing method and an apparatus, to prevent a network device from misunderstanding occurrence of a first event or a second event. The event processing method includes: determining first indication information, where the first indication information is used to indicate random access RA triggered by a first event or a second event, the first event refers to a quantity of transmissions of a scheduling request (SR) reaching a maximum quantity of transmissions of the SR, and the second event refers to, for an SR that has been triggered and that is in a pending state, there being no available physical uplink control channel (PUCCH) resource; and sending the first indication information.

15 Claims, 11 Drawing Sheets

(51) Int. Cl.
  *H04W 72/23* (2023.01)
  *H04W 74/00* (2009.01)
  *H04W 74/0816* (2024.01)
  *H04W 80/02* (2009.01)

(58) Field of Classification Search
  USPC ............................................................ 370/329
  See application file for complete search history.

(56) References Cited

U.S. PATENT DOCUMENTS

| | | | |
|---|---|---|---|
| 2018/0176961 | A1 | 6/2018 | Babaei et al. |
| 2019/0281585 | A1 | 9/2019 | Dinan |
| 2022/0124800 | A1* | 4/2022 | Shi .................... H04W 74/0833 |
| 2022/0256598 | A1* | 8/2022 | Kusashima ......... H04W 74/002 |
| 2022/0346174 | A1* | 10/2022 | Wang ................ H04W 74/0808 |
| 2022/0369139 | A1* | 11/2022 | Wang ................ H04W 74/0808 |
| 2022/0377813 | A1* | 11/2022 | Wang ................ H04W 72/0453 |
| 2022/0400396 | A1* | 12/2022 | Alfarhan ........... H04W 74/0808 |
| 2024/0179742 | A1* | 5/2024 | Kim .................. H04W 74/0816 |

FOREIGN PATENT DOCUMENTS

| | | |
|---|---|---|
| CN | 109863777 A | 6/2019 |
| CN | 114631348 A | 6/2022 |
| EP | 3736999 A1 | 11/2020 |
| RU | 2702266 C2 | 10/2019 |
| WO | 2016163831 A1 | 10/2016 |
| WO | 2017136458 A2 | 8/2017 |
| WO | 2017165405 A2 | 9/2017 |
| WO | 2019137446 A1 | 7/2019 |
| WO | 2019195563 A1 | 10/2019 |

OTHER PUBLICATIONS

A Mier "LTE Resource Scheduling (5)—Uplink Scheduling Request SR," Total 9 pages (Aug. 27, 2016). With English Translation.

"3rd Generation Partnership Project; Technical Specification Group Radio Access Network; NR; Medium Access Control (MAC) protocol specification (Release 15)," 3GPP TS 38.321 V15.7.0, pp. 1-78, 3rd Generation Partnership Project, Valbonne, France (Sep. 2019).

"Details of the Uplink LBT failure mechanism," 3GPP TSG-RAN2#107bis, Chongqing, China, R2-1912304, Total 3 pages, 3rd Generation Partnership Project, Valbonne, France (Oct. 14-18, 2019).

"UL LBT failure," 3GPP TSG-RAN WG2 Meeting 107bis, Chongqing, China, R2-1913029, Total 3 pages, 3rd Generation Partnership Project, Valbonne, France (Oct. 14-18, 2019).

"Running MAC CR for NR-U," 3GPP TSG-RAN2 # 107bis, Chongqing, China, R2-1914026 (R2-19xxxxx), Total 84 pages, 3rd Generation Partnership Project, Valbonne, France (Oct. 14-18, 2019).

"Remaining issues of consistent UL LBT failure," 3GPP TSG-RAN WG2 Meeting #108, Reno, USA, R2-1914400, pp. 1-4, 3rd Generation Partnership Project, Valbonne, France (Nov. 18-22, 2019).

Intel Corporation, "Detecting and Handling of UL LBT failures," 3GPP TSG-RAN WG2 106, Reno, Nevada, US, R2-1907382, Total 4 pages (May 13-17, 2019).

InterDigital, "Handling UL LBT Failures in MAC," 3GPP RAN WG2 Meeting #108, Reno, U.S.A, R2-1914882, Total 4 pages (Nov. 18-22, 2019).

* cited by examiner

EVENT PROCESSING METHOD AND APPARATUS

CROSS-REFERENCE TO RELATED APPLICATIONS

This application is a continuation of International Application No. PCT/CN2019/116504, filed on Nov. 8, 2019, the disclosure of which is hereby incorporated by reference in its entirety.

TECHNICAL FIELD

Embodiments of this application relate to the communications field, and in particular, to an event processing method and an apparatus.

BACKGROUND

In a communications system, for example, a new radio (NR) communications system, data of different service types may be carried through different logical channels (LCH), and one or more LCHs may be associated with one logical channel group (LCG). Each LCH may be associated with one scheduling priority, and the scheduling priority may be configured by a network device. An LCH with a high scheduling priority may be configured for a high-priority service (for example, an ultra-reliable and low-latency communication (URLLC) service), and an LCH with a low scheduling priority may be configured for a low-priority service (for example, an enhanced mobile broadband (eMBB) service).

When a terminal device has new uplink data, the terminal device may preferentially consider allocating an uplink resource according to the high-priority service. When new uplink data arrives at the terminal device, but there is no to-be-sent uplink data on any LCH included in all LCGs, or there is to-be-sent uplink data on an LCH with a higher priority, the terminal device may trigger a buffer status report (BSR), to reflect an amount of to-be-sent data on at least one LCG, so that the network device performs scheduling based on the amount of to-be-sent data.

Before delivering control signaling to indicate the uplink resource, the network device may not know that the terminal device has uplink data to be sent. Therefore, the terminal device first needs to request, through a preconfigured or common uplink resource, the network device to allocate the uplink resource. For example, the terminal device may send a scheduling request (SR) on a physical uplink control channel (PUCCH) resource to request the uplink resource, or may initiate random access (RA) on a physical random access channel (PRACH) to request the uplink resource. After the terminal device triggers the SR, the SR enters a pending state, to wait for an SR transmission occasion to send the SR.

Case 1: When the terminal device triggers the SR and there is an available PUCCH resource, and the SR fails (which may be referred to as a first event) because a maximum quantity of sending times is reached, the terminal device triggers the RA and releases the uplink resource. Case 2: When the terminal device triggers the SR but there is no available PUCCH resource (which may be referred to as a second event), the terminal device triggers the RA and cancels the pending SR. The RA in each of the two cases may include the BSR to indicate the amount of to-be-sent data on at least one LCG. The network device determines, based on an amount of to-be-sent data and a known uplink resource configuration on each LCG in the BSR, whether the RA is triggered by the first event or the second event, and further determines different processing manners of the uplink resource.

When the BSR indicates that an amount of to-be-sent data on only one LCG is not 0, the network device may determine, based on a service type and an uplink resource configuration corresponding to the LCG, whether the RA is triggered by the first event or the second event. However, when the BSR indicates that amounts of to-be-sent data on two or more LCGs are not 0, the network device cannot determine an LCG whose corresponding service type triggers the RA, so that the network device cannot determine, with reference to the uplink resource configuration, whether the RA is triggered by the first event or the second event. If the network device misunderstands occurrence of the first event or the second event, an incorrect processing manner is used for the uplink resource, thereby wasting air interface signaling or affecting system performance.

SUMMARY

Embodiments of this application provide an event processing method and an apparatus, to prevent a network device from misunderstanding occurrence of a first event or a second event.

To achieve the foregoing objective, the following technical solutions are used in the embodiments of this application:

According to a first aspect, an event processing method is provided. The method includes: determining first indication information, where the first indication information is used to indicate random access (RA) triggered by a first event or a second event, the first event refers to that a quantity of transmissions of a scheduling request (SR) reaches a maximum quantity of transmissions of the SR, and the second event refers to that for an SR that has been triggered and that is in a pending state, there is no available physical uplink control channel (PUCCH) resource; and sending the first indication information.

According to the event processing method provided in this embodiment of this application, a terminal device sends the first indication information to a network device, where the first indication information is used to indicate the RA triggered by the first event or the second event, so as to prevent a waste of air interface signaling or impact on system performance that occurs because the network device misunderstands occurrence of the first event or the second event and uses an incorrect processing manner for an uplink resource.

In a possible implementation, the first indication information is indicated by an information element IE or a cause value in a radio resource control (RRC) message. In this implementation, the first indication information is indicated by an RRC layer.

In a possible implementation, the first indication information includes second indication information indicating arrival of high-priority data or third indication information indicating arrival of low-priority data, and the second indication information or the third indication information is used to determine the first event or the second event. In this implementation, the first indication information is implicitly indicated.

In a possible implementation, the first indication information is indicated by a logical channel identifier (LCID), a reserved bit, or a payload in a media access control control element (MAC CE). In this implementation, the first indication information is indicated by a MAC layer.

In a possible implementation, when the first indication information is indicated by the LCID, or when the first indication information is indicated by the payload in the MAC CE, the first indication information is further used to indicate that the payload in the MAC CE is a first cell radio network temporary identifier (C-RNTI). In this implementation, the first indication information is reused, and may be further used to indicate the C-RNTI.

In a possible implementation, the first indication information is indicated by a BSR in the RA, and in amounts of to-be-sent data on all logical channel groups in the BSR, when the RA is triggered by the first event, an amount of to-be-sent data on an LCG corresponding to at least one logical channel that has no available PUCCH resource is set to 0; or when the RA is triggered by the second event, an amount of to-be-sent data on an LCG corresponding to at least one LCH that has an available PUCCH resource is set to 0. In this implementation, an amount of to-be-sent data on an LCG that is not triggered by the first event or the second event is forcibly set to 0, so that the network device can determine, based on the BSR, the RA triggered by the first event or the second event.

In a possible implementation, the first indication information is indicated by different random access channel (RACH) resources. In this implementation, the first indication information is indicated by a physical layer.

In a possible implementation, the first indication information is indicated by uplink control information (UCI) in a PUCCH resource. In this implementation, the first indication information is indicated by the UCI.

According to a second aspect, an event processing method is provided. The method includes: receiving first indication information, where the first indication information is used to indicate RA triggered by a first event or a second event, the first event refers to that a quantity of transmissions of a SR reaches a maximum quantity of transmissions of the SR, and the second event refers to that for an SR that has been triggered and that is in a pending state, there is no available PUCCH resource; and determining, based on the first indication information, the RA triggered by the first event or the second event.

In a possible implementation, the first indication information is indicated by an information element (IE) or a cause value in a RRC message.

In a possible implementation, the first indication information includes second indication information indicating arrival of high-priority data or third indication information indicating arrival of low-priority data, and the second indication information or the third indication information is used to determine the first event or the second event.

In a possible implementation, the first indication information is indicated by a LCID, a reserved bit, or a payload in a MAC CE.

In a possible implementation, when the first indication information is indicated by the LCID, or when the first indication information is indicated by the payload in the MAC CE, the first indication information is further used to indicate that the payload in the MAC CE is a first C-RNTI.

In a possible implementation, the first indication information is indicated by a BSR in the RA, and in amounts of to-be-sent data on all logical channel groups in the BSR, when the RA is triggered by the first event, an amount of to-be-sent data on an LCG corresponding to at least one logical channel that has no available PUCCH resource is set to 0; or when the RA is triggered by the second event, an amount of to-be-sent data on an LCG corresponding to at least one LCH that has an available PUCCH resource is set to 0.

In a possible implementation, the first indication information is indicated by different RACH resources.

In a possible implementation, the first indication information is indicated by UCI in a PUCCH resource.

For a technical effect of this implementation, refer to any one of the first aspect and the implementations of the first aspect.

According to a third aspect, an event processing method is provided. The method includes: determining first indication information, where the first indication information is used to indicate a cell in which a first event occurs, and the first event refers to that a quantity of uplink LBT failures reaches a preset maximum quantity of times; and sending the first indication information.

According to the event processing method provided in this embodiment of this application, a terminal device sends the first indication information to a network device, where the first indication information is used to indicate the cell in which the first event occurs, and the first event refers to that the quantity of uplink LBT failures reaches the preset maximum quantity of times. Therefore, the network device learns of the cell in which the first event occurs.

In a possible implementation, the method further includes: sending second indication information, where the second indication information is used to indicate a bandwidth part (BWP) in which the first event occurs. In this implementation, the BWP in which the first event occurs may be further indicated.

In a possible implementation, the first indication information is indicated by a MAC CE. In this implementation, the first indication information is indicated by a MAC layer.

In a possible implementation, the first indication information is an identifier of the cell in which the first event occurs. In this implementation, the first indication information is indicated in an explicit manner.

In a possible implementation, the first indication information is a bitmap, and the cell in which the first event occurs corresponds to one bit in the bitmap. In this implementation, the first indication information is indicated in an implicit manner.

In a possible implementation, the method further includes: determining to send data not through an uplink grant of the cell in which the first event occurs or the BWP in which the first event occurs.

According to a fourth aspect, an event processing method is provided. The method includes: receiving first indication information, where the first indication information is used to indicate a cell in which a first event occurs, and the first event refers to that a quantity of uplink LBT failures reaches a preset maximum quantity of times; and determining, based on the first indication information, the cell in which the first event occurs.

In a possible implementation, the method further includes: receiving second indication information, where the second indication information is used to indicate a bandwidth part BWP in which the first event occurs.

In a possible implementation, the first indication information is indicated by a MAC CE.

In a possible implementation, the first indication information is an identifier of the cell in which the first event occurs.

In a possible implementation, the first indication information is a bitmap, and the cell in which the first event occurs corresponds to one bit in the bitmap.

In a possible implementation, the method further includes:

determining to receive data not through an uplink grant of the cell in which the first event occurs or the BWP in which the first event occurs.

For a technical effect of this implementation, refer to any one of the third aspect and the implementations of the third aspect.

According to a fifth aspect, an event processing method is provided. The method includes: determining a first event, where the first event refers to that a quantity of transmissions of a first SR reaches a maximum quantity of transmissions of the SR, and the first SR is carried on a first PUCCH resource; and sending a second SR on a second PUCCH resource, where a cell to which the second PUCCH resource belongs and a cell to which the first PUCCH resource belongs belong to different timing advance groups (TAG), or a cell to which the second PUCCH resource belongs and a primary serving cell belong to different TAGs.

According to the event processing method provided in this embodiment of this application, when determining that the first event occurs on the first PUCCH resource, a terminal device sends the second SR on the second PUCCH resource, so that RA triggered by the first event can be avoided, and RA triggered by a second event is allowed, so as to prevent a waste of air interface signaling or impact on system performance that occurs because a network device misunderstands occurrence of the first event or the second event and uses an incorrect processing manner for an uplink resource.

In a possible implementation, the method further includes: releasing an uplink resource and/or a configured downlink assignment of at least one serving cell that belongs to a first TAG, where the first TAG is a TAG of the cell to which the first PUCCH resource belongs.

According to a sixth aspect, an event processing method is provided. The method includes: determining RA triggered by a first event or a second event, where the first event refers to that a quantity of transmissions of a SR reaches a maximum quantity of transmissions of the SR, and the second event refers to that for an SR that has been triggered and that is in a pending state, there is no available PUCCH resource; when the first event triggers the RA, canceling an SR that triggers the first event and that is in the pending state, and skipping releasing uplink resources and/or configured downlink assignments of all serving cells; and when the second event triggers the RA, canceling, after the RA is completed, the SR that triggers the second event and that is in the pending state.

According to the event processing method provided in this embodiment of this application, when the first event triggers the RA, the pending SR that triggers the first event is canceled, and the uplink resources and/or the configured downlink assignments of all serving cells are not released, so that the SR triggered by the second event still has an opportunity to be transmitted instead of being canceled because of the RA triggered by the first event. When the second event triggers the RA, the SR that triggers the second event and that is in the pending state is canceled after the RA is completed, so as to avoid that the RA triggered by the second event is interrupted by other RA. Therefore, more transmission opportunities are provided for the RA triggered by the second event. When the RA is triggered by the first event or the second event, the SR is canceled, thereby preventing RA triggered by concurrent first events or second events from affecting each other, and further preventing impact on a service of another cell in which the first event does not occur.

In a possible implementation, the method further includes: when the first event triggers the RA, releasing an uplink resource and/or a configured downlink assignment of at least one serving cell that belongs to a first TAG, where the first TAG is a TAG of a cell corresponding to a LCH that triggers the first event. In this implementation, a TAG of a cell corresponding to an LCH that does not trigger the first event may not be affected.

According to a seventh aspect, a communications apparatus is provided. The communications apparatus includes a processing module and a transceiver module, where the processing module is configured to control the transceiver module to perform the method according to any one of the first aspect and the implementations of the first aspect, the method according to any one of the third aspect and the implementations of the third aspect, the method according to any one of the fifth aspect and the implementations of the fifth aspect, and the method according to any one of the sixth aspect and the implementations of the sixth aspect.

According to an eighth aspect, a communications apparatus is provided. The communications apparatus includes a processing module and a transceiver module, where the processing module is configured to control the transceiver module to perform the method according to any one of the second aspect and the implementations of the second aspect, and the method according to any one of the fourth aspect and the implementations of the fourth aspect.

According to a ninth aspect, a communications apparatus is provided. The communications apparatus includes a processor, a memory, and a transceiver, where the processor is coupled to the memory, and when executing a computer program or an instruction in the memory, the processor performs the method according to any one of the first aspect and the implementations of the first aspect, the method according to any one of the third aspect and the implementations of the third aspect, the method according to any one of the fifth aspect and the implementations of the fifth aspect, and the method according to any one of the sixth aspect and the implementations of the sixth aspect.

According to a tenth aspect, a communications apparatus is provided. The communications apparatus includes a processor, a memory, and a transceiver, where the processor is coupled to the memory, and when executing a computer program or an instruction in the memory, the processor performs the method according to any one of the second aspect and the implementations of the second aspect, and the method according to any one of the fourth aspect and the implementations of the fourth aspect.

According to an eleventh aspect, a chip is provided. The chip includes a processor and an interface, and is configured to invoke, from a memory, and run a computer program stored in the memory, to perform the method according to any one of the first aspect to the sixth aspect and the implementations of the first aspect to the sixth aspect.

According to a twelfth aspect, a computer-readable storage medium is provided. The computer-readable storage medium stores an instruction, and when the instruction is run on a computer or a processor, the computer or the processor is enabled to perform the method according to any one of the first aspect to the sixth aspect and the implementations of the first aspect to the sixth aspect.

According to a thirteenth aspect, a computer program product including an instruction is provided. When the instruction is run on a computer or a processor, the computer or the processor is enabled to perform the method according to any one of the first aspect to the sixth aspect and the implementations of the first aspect to the sixth aspect.

For technical effects of the seventh aspect to the thirteenth aspect, refer to the content described in the possible implementations of the first aspect to the sixth aspect.

DESCRIPTION OF EMBODIMENTS

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

The embodiments of this application may be used in a time division duplexing (TDD) scenario, or may be used in a frequency division duplexing (FDD) scenario.

The embodiments of this application may be used in both a licensed spectrum system and an unlicensed spectrum system, for example, licensed-assisted access (LAA) and new radio-based unlicensed spectrum access (NRU) systems.

The embodiments of this application may be used in a universal mobile telecommunications system (UMTS), a code division multiple access (CDMA) system, a wireless local area network (WLAN), a 5th generation (5G) wireless communications system such as a new radio (NR) system or evolved LTE (eLTE) of a new radio access technology, or the like, where an eLTE access network device may be connected to both an LTE core network and a 5G core network.

The embodiments of this application are described based on a 5G network scenario in a wireless communications network. It should be noted that, the solutions of the embodiments of this application may also be used in another wireless communications network, and a corresponding name may be replaced with a corresponding function name in the another wireless communications network.

Figure 1:
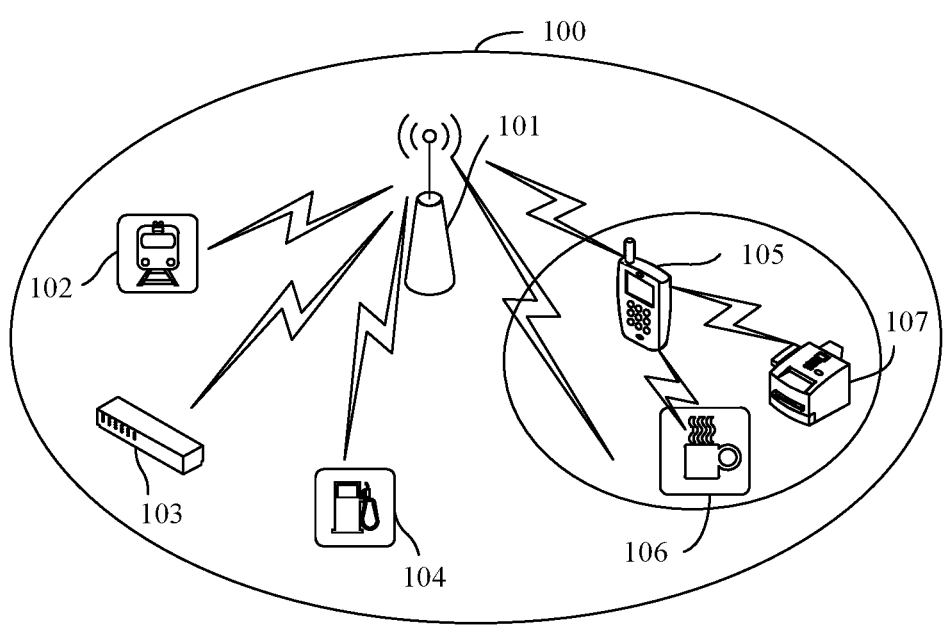
FIG. 1 is a schematic architectural diagram of a communications system according to an embodiment of this application.

As shown in FIG. 1, a communications system 100 provided in an embodiment of this application includes a network device 101 and terminal devices 102 to 107.

The terminal device mentioned in this embodiment of this application may be a device that provides a user with voice and/or data connectivity, a handheld device with a radio connection function, or another processing device connected to a radio modem. A wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the wireless terminal is a device such as user equipment (UE), a personal communication service (PCS) phone, a cordless phone, a session initiation protocol (SIP) phone, a wireless local loop (WLL) station, and a personal digital assistant (PDA). The wireless terminal may also be referred to as a system, a subscriber unit, a subscriber station, a mobile station, a mobile terminal, a remote station, an access point, a remote terminal, an access terminal, a user terminal, a user agent a user device, or user equipment. For example, the terminal device may be a high-speed railway communications device 102, a smart air conditioner 103, a smart fuel dispenser 104, a mobile phone 105, a smart teacup 106, a printer 107, or the like. This is not limited in this application.

In this embodiment of this application, the network device may be a device that is in an access network and that communicates with and connects to the terminal device over an air interface by using a sector. The network device may be configured to mutually convert a received over-the-air frame and an internet protocol (IP) packet and serve as a router between the terminal device and a rest portion of the access network, where the rest portion of the access network may include an IP network. The network device may further coordinate attribute management of the air interface. For example, a base station may be an evolved NodeB (eNB or eNodeB) in LTE, or may be a gNB, a transmission and reception point (TRP), a centralized processing unit (CU), a distributed processing unit (DU), or the like in 5G. This is not limited in this embodiment of this application. The foregoing base station is merely an example for description. The network device may alternatively be a relay station, an access point, a vehicle-mounted device, a wearable device, or a device of another type.

Figure 2:
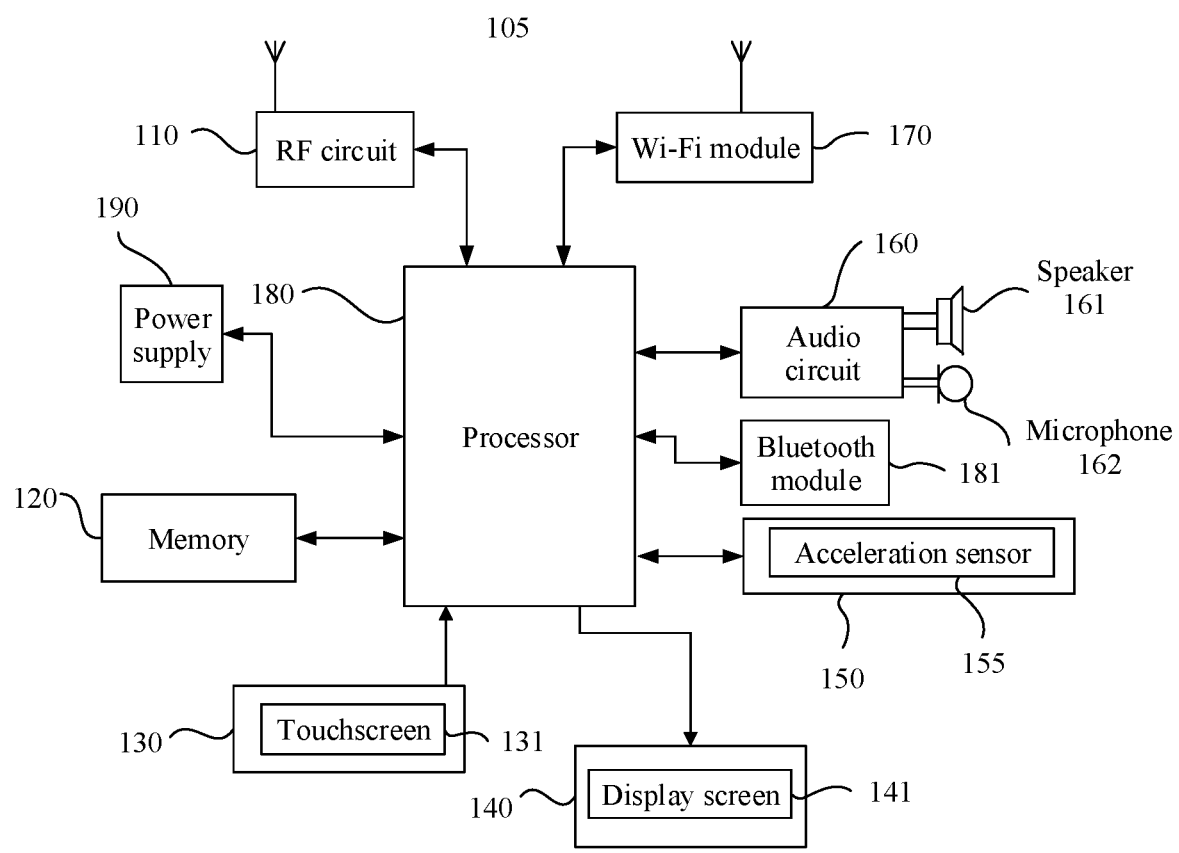
FIG. 2 is a schematic structural diagram of a terminal device according to an embodiment of this application.

As shown in FIG. 2, an example in which the terminal device is a mobile phone is used to describe a structure of the terminal device.

The terminal device 105 may include components such as a radio frequency (RF) circuit 110, a memory 120, an input unit 130, a display unit 140, a sensor 150, an audio circuit 160, a wireless fidelity (Wi-Fi) module 170, a processor 180, a Bluetooth module 181, and a power supply 190.

The RF circuit 110 may be configured to receive and send a signal during information receiving and sending or during a call. The RF circuit 110 may receive downlink data from a base station and then deliver the downlink data to the processor 180 for processing, and may send uplink data to the base station. Generally, the RF circuit includes but is not limited to devices such as an antenna, at least one amplifier, a transceiver, a coupler, a low noise amplifier, and a duplexer.

The memory 120 may be configured to store a software program and data. The processor 180 runs the software program or the data stored in the memory 120, to perform various functions of the terminal device 105 and process data. The memory 120 may include a high-speed random access memory, and may further include a nonvolatile memory, for example, at least one magnetic disk storage device, a flash memory device, or another volatile solid-state storage device. The memory 120 stores an operating system that supports running of the terminal device 105, for example, an iOS® operating system developed by Apple, an Android® open-source operating system developed by Google, and a Windows® operating system developed by Microsoft. The memory 120 in this application may store the operating system and various application programs, and may further store code for performing the method in the embodiments of this application.

The input unit 130 (for example, a touchscreen) may be configured to receive input digit or character information, and generate signal input related to user setting and function control of the terminal device 105. Specifically, the input unit 130 may include a touchscreen 131 disposed on a front surface of the terminal device 105, and may collect a touch operation of a user on or near the touchscreen 131.

The display unit 140 (namely, a display screen) may be configured to display information input by the user or information provided for the user, and graphical user interfaces (GUI) of various menus of the terminal device 105. The display unit 140 may include a display screen 141 disposed on the front surface of the terminal device 105. The display screen 141 may be configured in a form of a liquid crystal display, a light emitting diode, or the like. The display unit 140 may be configured to display various graphical user interfaces described in this application. The touchscreen 131 may cover the display screen 141, or the touchscreen 131 may be integrated with the display screen 141 to implement input and output functions of the terminal device 105. After integration, the touchscreen 131 and the display screen 141 may be referred to as a touch display screen for short.

The terminal device 105 may further include at least one sensor 150, for example, a light sensor or a motion sensor. The terminal device 105 may be further provided with another sensor, such as a gyroscope, a barometer, a hygrometer, a thermometer, and an infrared sensor.

The audio circuit 160, a speaker 161, and a microphone 162 may provide an audio interface between the user and the terminal device 105. The audio circuit 160 may transmit, to the speaker 161, a received electrical signal obtained after audio data conversion, and the speaker 161 converts the electrical signal into a sound signal for output. In addition, the microphone 162 converts a collected sound signal into an electrical signal. The audio circuit 160 receives the electrical signal, then converts the electrical signal into audio data, and outputs the audio data to the RF circuit 110, to send the audio data to, for example, another terminal, or outputs the audio data to the memory 120 for further processing.

Wi-Fi is a short-distance radio transmission technology. The terminal device 105 may help, through the Wi-Fi module 170, the user to receive and send an email, browse a web page, access streaming media, and the like. The Wi-Fi module 170 provides wireless broadband internet access for the user.

The processor 180 is a control center of the terminal device 105, is connected to each part of the entire terminal through various interfaces and lines, and performs various functions of the terminal device 105 and data processing by running or executing a software program stored in the memory 120 and by invoking data stored in the memory 120. In this application, the processor 180 may be one or more processors, and the processor 180 may include one or more processing units. The processor 180 may further integrate an application processor and a baseband processor. The application processor mainly processes an operating system, a user interface, an application program, and the like. The baseband processor mainly processes wireless communication. It may be understood that the baseband processor may alternatively not be integrated into the processor 180. In this application, the processor 180 may perform a method in the embodiments of this application.

The Bluetooth module 181 is configured to exchange information, through a Bluetooth protocol, with another Bluetooth device having a Bluetooth module. For example, the terminal device 105 may establish, through the Bluetooth module 181, a Bluetooth connection to a wearable electronic device (for example, a smartwatch) that also has a Bluetooth module, to exchange data.

The terminal device 105 further includes the power supply 190 (such as a battery) that supplies power to various components. The power supply may be logically connected to the processor 180 through a power management system, to implement functions such as charging, discharging, and power consumption management through the power management system.

Figure 3:
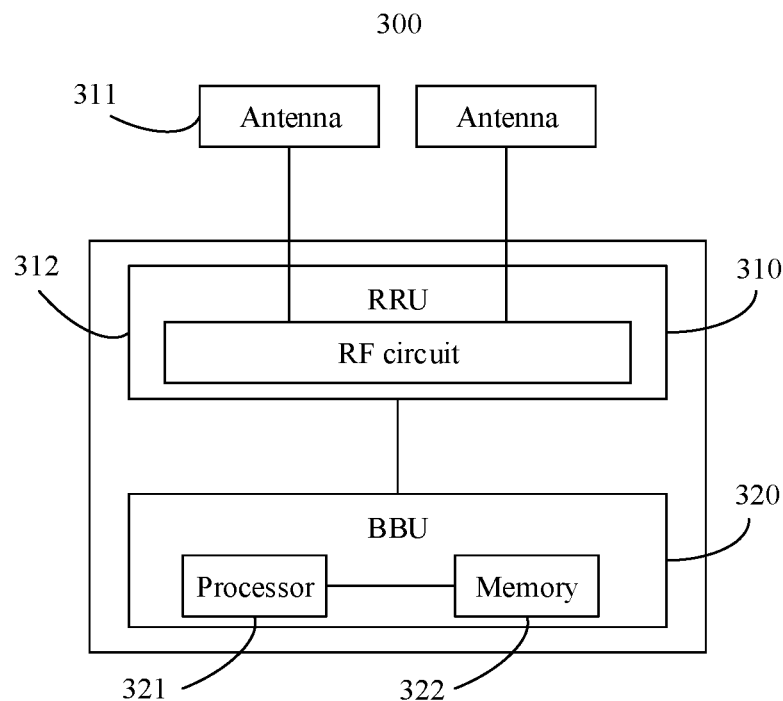
FIG. 3 is a schematic structural diagram of a network device according to an embodiment of this application.

As shown in FIG. 3, an embodiment of this application provides a schematic structural diagram of a network device. The network device 300 may include one or more radio frequency units, for example, a remote radio unit (RRU) 310 and one or more baseband units (BBU) (which may also be referred to as a digital unit (DU)) 320. The RRU 310 may be referred to as a transceiver unit. Optionally, the transceiver unit 310 may be further referred to as a transceiver machine, a transceiver circuit, a transceiver, a transmitter/receiver, or the like, and may include at least one antenna 311 and an RF circuit 312. Optionally, the transceiver unit 310 may include a receiving unit and a sending unit. The receiving unit may correspond to a receiver (or referred to as a receiving machine or a receiving circuit), and the sending unit may correspond to a transmitter (or referred to as a transmitting machine or a transmitting circuit). The RRU 310 is mainly configured to: receive and send a radio frequency signal, and perform conversion between the radio frequency signal and a baseband signal. For example, the RRU 310 is configured to send indication information to a terminal device. The BBU 320 is mainly configured to perform baseband processing, control the network device, and the like. The RRU 310 and the BBU 320 may be physically disposed together, or may be physically disposed separately, namely, a distributed base station.

The BBU 320 is a control center of the network device, may also be referred to as a processing unit, and is mainly configured to complete baseband processing functions such as channel coding, multiplexing, modulation, and spectrum spreading. For example, the BBU 320 may be configured to control the network device to perform the method in this application.

In an example, the BBU 320 may include one or more boards, and a plurality of boards may jointly support a radio access network (for example, an LTE network) having a single access standard, or may separately support radio access networks (for example, an LTE network, a 5G network, or another network) having different access standards. The BBU 320 further includes a memory 322 and a processor 321. The memory 322 is configured to store a necessary instruction and necessary data. The processor 321 is configured to control the network device to perform a necessary action, for example, configured to control the network device to perform the method in this application. In this application, the processor 321 may be one or more processors. The memory 322 and the processor 321 may serve one or more boards. In other words, a memory and a processor may be disposed on each board. Alternatively, a plurality of boards may share a same memory and a same processor. In addition, a necessary circuit may be further disposed on each board.

In addition, the network device is not limited to the foregoing forms, and may also be in another form. For example, the network device includes a BBU and an adaptive radio unit (adaptive radio unit, ARU), or includes a BBU and an active antenna unit (AAU), or may be customer premises equipment (CPE), or may be in another form. This is not limited in this application.

First, some concepts in this application are described.

Scheduling request (SR):

As described above, data of different service types in an NR system may be carried through different LCHs, different service types may be carried through different logical channels, and one or more LCHs may be associated with one LCG. Each LCH may be associated with one scheduling priority, and the scheduling priority may be configured by a network device. An LCH with a high scheduling priority may be configured for a high-priority service (for example, a URLLC service), and an LCH with a low scheduling priority may be configured for a low-priority service (for example, an eMBB service).

When a terminal device has new uplink data, the terminal device may preferentially consider allocating an uplink resource according to the high-priority service. When new uplink data arrives at the terminal device, but there is no to-be-sent uplink data on any LCH included in all LCGs, or there is to-be-sent uplink data on an LCH with a higher priority, the terminal device may trigger a BSR, to reflect an amount of to-be-sent data on at least one LCG, so that the network device performs scheduling based on the amount of to-be-sent data.

However, before delivering control signaling to indicate the uplink resource, the network device may not know that the terminal device has uplink data to be sent. Therefore, when the terminal device triggers the BSR and there is no available uplink resource for data transmission, the terminal device first needs to request, through a preconfigured or common uplink resource, the network device to allocate the uplink resource. For example, the terminal device may transmit an SR on a PUCCH resource to request the uplink resource, or may transmit RA on a PRACH to request the uplink resource.

The PUCCH resource is a periodic resource, and the network device configures frequency domain resource information and time domain resource information (for example, start time information and a periodicity) of the PUCCH resource. After obtaining the frequency domain resource information and the time domain resource information, the terminal device may determine a periodic SR transmission occasion. After triggering the SR, the terminal device enters a pending state, to wait for an SR transmission occasion to transmit the SR.

Binding between the SR and a service:

In the NR system, the network device may indicate one or more SR configurations to the terminal device. Each SR configuration includes available PUCCH resources for the SR. These PUCCH resources may be distributed in different cells, or distributed in bandwidth parts (BWP) at different frequency domain positions in a same cell.

For an LCH that is of the terminal device and that is used to carry data of various service types, each LCH may be associated with zero or one SR configuration, and each BWP of each LCH may be configured with zero or one PUCCH resource. When there is no available PUCCH resource, or when a priority of the service type is relatively low, or when an arrival periodicity of data of the service type is relatively long, in order to save air interface resources, the network device may choose not to indicate an SR configuration to an LCH that carries the data of the service type, that is, the network device does not configure a PUCCH resource.

For example, in Assumption 1, it is assumed that the terminal device has a logical channel LCH #4 and a logical channel LCH #5. The logical channel LCH #4 belongs to a logical channel group LCG #1, and the logical channel LCH #4 is used to carry data of the eMBB service. However, if the network device does not indicate an SR configuration for the logical channel LCH #4, the logical channel LCH #4 has no available PUCCH resource for the SR. In addition, it is assumed that the logical channel LCH #5 belongs to a logical channel group LCG #2, and the logical channel LCH #5 is used to carry data of the URLLC service. The network device indicates an SR configuration (a PUCCH resource #2) for the logical channel LCH #5, so that the logical channel LCH #5 has a PUCCH resource (the PUCCH resource #2) available for the SR.

When data of different service types arrives, the terminal device may determine, based on an LCH corresponding to the data of the service type, whether there is a corresponding SR configuration, and perform the SR based on the SR configuration. In this way, the network device can learn of a service type of to-be-sent data of the terminal device.

For example, based on the foregoing assumption, when the terminal device needs to send data of the URLLC service, the terminal device may determine, through the SR configuration of the logical channel LCH #5, that the PUCCH resource available for the SR is the PUCCH resource #2, that is, may transmit the SR by using the PUCCH resource #2. After detecting the SR on the PUCCH resource #2, the network device may learn that the service type of the to-be-sent data of the terminal device is the URLLC service, so that the network device may schedule an uplink resource applicable to the URLLC service, for example, schedule an uplink resource with relatively short duration, or schedule a more reliable uplink resource. In this way, a transmission requirement of the URLLC service, namely, a low latency and high reliability, is satisfied.

SR sending mechanism—first event and second event:

When the terminal device triggers the SR and there is an available PUCCH resource, the terminal device may transmit the SR on the PUCCH resource, and each time the SR is transmitted, a count value of an SR counter is iteratively increased by 1.

When a quantity of transmissions of the SR (the count value of the SR counter) does not reach a maximum quantity of transmissions of the SR (SR TransMax) configured by radio resource control, a medium access control (MAC) entity of the terminal device performs the following actions:

iteratively increasing the count value of the SR counter by 1; and notifying a physical layer to transmit the SR on the PUCCH resource available for the SR; and enabling an SR prohibit timer.

When the first event occurs (where the quantity of transmissions of the SR (the count value of the SR counter) reaches the maximum quantity of transmissions of the SR (SR TransMax) configured by the radio resource control (RRC)), this case is also referred to as an SR failure, and the MAC entity of the terminal device performs the following actions:

notifying the RRC to release PUCCH resources of all serving cells;

notifying the RRC to release sounding reference signals (SRS) of all serving cells;

clearing a physical uplink shared channel (PUSCH) resource used for reporting semi-persistent channel state information (SP-CSI);

clearing all configured uplink grants (CG);

clearing all configured downlink assignments (CDA); and triggering RA and canceling all pending SRs.

When the second event occurs (where for an SR that has been triggered and that is in a pending state, there is no available PUCCH resource), the MAC entity of the terminal device performs the following actions:

triggering RA and canceling the pending SR that triggers the second event.

Random access (RA):

In LTE, the terminal device may achieve the following objective through the RA: obtaining uplink synchronization, and obtaining a unique cell radio network temporary identifier (C-RNTI). In LTE, the RA is usually triggered by one of the following six types of events. FIG. 6 to FIG. 14 in this application are described around the first event and the second event in the fifth type of event.

First-type event: A wireless connection is established during initial access.

Second-type event: An RRC connection re-establishment process is performed.

Third-type event: A handover process is performed.

Fourth-type event: In an RRC-connected state, when downlink data arrives, an uplink is in an out-of-synchronization state.

Fifth-type event: In the RRC-connected state, when uplink data arrives, the uplink is in the out-of-synchronization state, so that the quantity of transmissions of the SR (the count value of the SR counter) reaches the maximum quantity of transmissions of the SR (namely, the first event), or for the SR that has been triggered and that is in the pending state, there is no available PUCCH resource (namely, the second event).

Sixth-type event: In the RRC-connected state, the terminal device is located.

In the NR system, system information (SI) includes minimum system information (MSI) and other system information (OSI) that are used by the terminal device to access a network. The MSI is periodically broadcast by the network, and sending of the OSI is triggered by a network side or triggered by a request of the terminal device. In other words, in the NR system, a random access process may also be triggered by requesting the OSI.

In addition, the NR system may also support a beamforming technology. To be specific, a transmitter weights uplink and downlink signals to form a narrow beam aligned with a receiver, so as to direct transmit energy at the receiver, thereby improving a demodulation signal-to-noise ratio of the receiver, and further improving a system coverage rate and a transmission success rate. When channel quality of a current serving beam deteriorates, beam failure recovery (BFR) may also be requested through the random access process.

The RA includes contention-based RA (CBRA) and non-contention-based RA (NCBRA) or (CFRA)).

Figure 4:
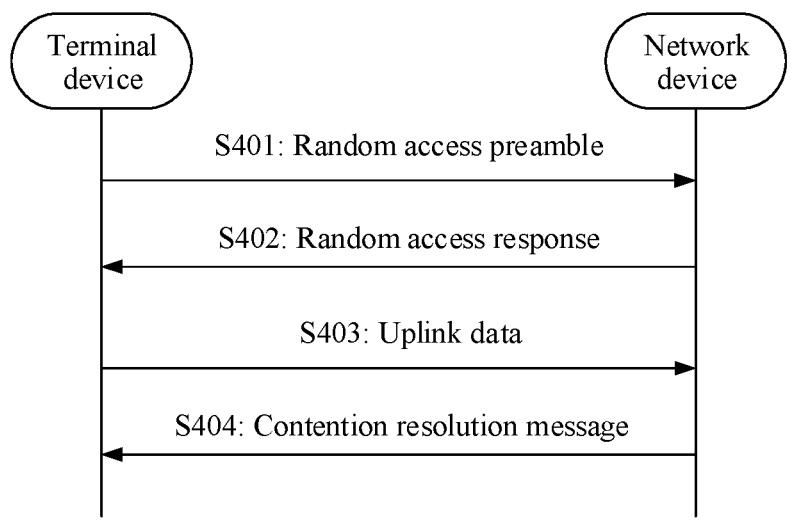
FIG. 4 is a schematic flowchart of a four-step random access process according to an embodiment of this application.

Four-step CBRA in the NR system is used as an example. As shown in FIG. 4, a four-step random access process performed by a terminal device and a network device is as follows:

S401: The terminal device sends a random access preamble.

The message may be referred to as a message 1 (MSG 1) for short, and is used to notify the network device that there is a random access request, so that the network device can estimate a transmission latency between the network device and the terminal device, to calibrate uplink timing.

The random access preamble is transmitted on a physical random access channel (PRACH). The network device may notify, through a system message, the terminal device of a PRACH time-frequency resource set that can be used to transmit the random access preamble in a current cell. When initiating RA, for CBRA, the terminal device may select a PRACH resource to transmit the random access preamble; and for CFRA, the terminal device may transmit the random access preamble by using a PRACH resource specified by the network device.

Each cell has 64 available random access preambles. When initiating the RA, for the CBRA, the terminal device may select a random access preamble; and for the CFRA, the terminal device may use a random access preamble specified by the network device.

S402: The network device sends a random access response (RAR) message corresponding to the received random access preamble.

Figure 5:
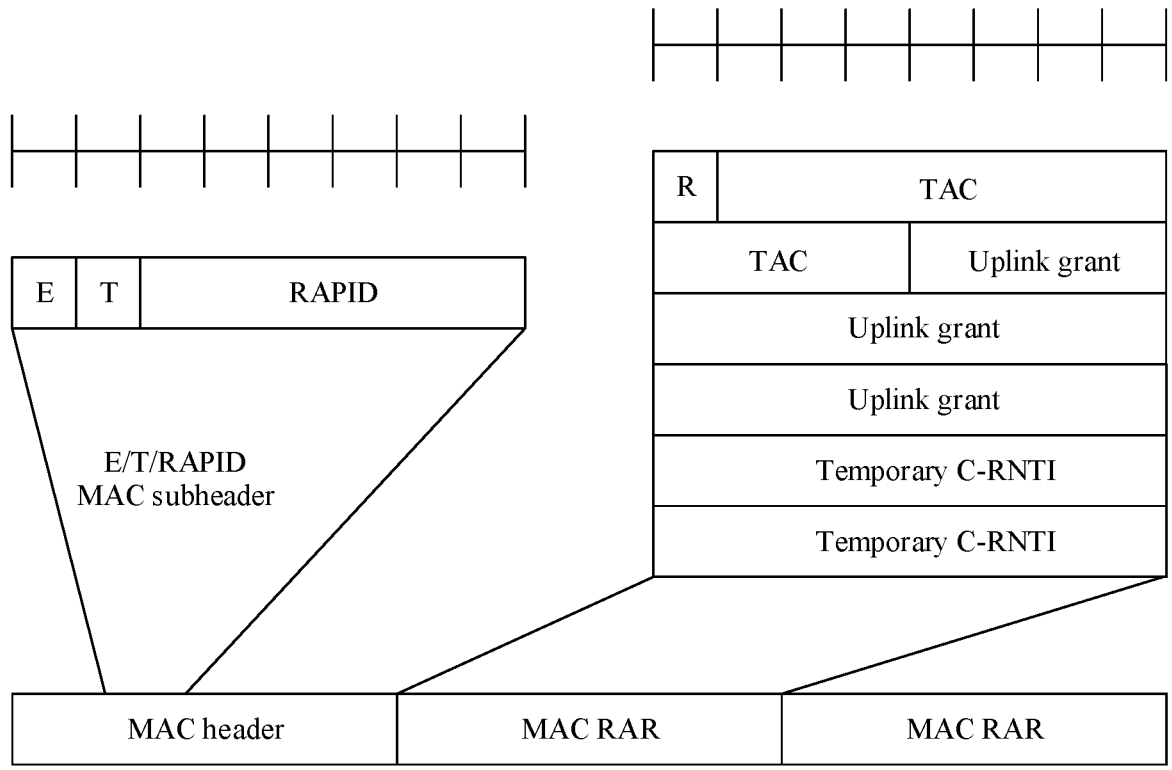
FIG. 5 is a schematic diagram of a format of a RAR message according to an embodiment of this application.

The message may be referred to as a message 2 (MSG 2) for short. FIG. 5 shows a format of a RAR message. The RAR message is carried in a MAC control element (CE). The MAC CE includes a MAC header and at least one MAC RAR.

The MAC header includes an E/T/RAPID MAC sub-header, where E represents an extended domain and indicates whether there is a subsequent MAC subheader, 1 represents that there is still one MAC subheader, and 0 represents that there is no MAC subheader. T represents a type domain and indicates whether subsequent data is a backoff indication (backoff indication, BI) or a random access preamble identifier (RAPID).

In the MAC RAR, R represents a reserved bit. A timing advance command (TAC) occupies 11 bits, and is used to indicate a timing advance (TA) for performing uplink synchronization by the terminal device, that is, a transmission latency between the network device and the terminal device. Uplink grant information occupies 20 bits, and is used to indicate a resource for subsequently transmitting a message 3 (MSG 3) by the terminal device, including parameters such as a time-frequency position, whether frequency hopping is performed, and power control. A temporary C-RNTI occupies 16 bits, and is used by the terminal device to perform scrambling when the terminal device subsequently transmits the MSG 3.

For the CBRA, after receiving the RAR message, the terminal device determines whether the random access preamble identifier in the RAR message is the same as that of the random access preamble sent in step S401. If the identifiers are the same, it is considered that the RAR message is successfully received. Otherwise, it is considered that the RAR message fails to be received, and the terminal device may re-initiate the RA.

For the CFRA, because the random access preamble is dedicated to the terminal device, no contention exists. In addition, because the terminal device already has a unique identifier C-RNTI in an accessed cell, the network device does not need to allocate a C-RNTI. Therefore, only the CBRA needs steps S403 and S404.

S403: The terminal device sends uplink data.

The terminal device sends, based on the uplink grant information in the RAR message, the uplink data on a corresponding uplink transmission resource through a physical uplink shared channel (PUSCH). The message may be referred to as a message 3 (MSG 3) for short.

The uplink data may include an RRC message and identification information of the terminal device, for example, a C-RNTI, a resume identifier (resume ID), or an inactive radio network temporary identifier (I-RNTI). The resume identifier or the I-RNTI is allocated by the network side to the terminal device, and the terminal device reports the identifier for the network device to identify an identity of the terminal device and related context information. The RRC message may be sent to the network device after protocol stack processing at each layer is completed by using a signaling radio bearer (SRB).

S404: The network device sends a contention resolution message.

The message may be referred to as a message 4 (MSG 4) for short. Because in step S403, the terminal device sends the identification information of the terminal device, in a contention resolution mechanism, the network device includes the identification information of the terminal device through step S404 to specify a terminal device that wins in contention resolution, and other UEs that do not win in contention resolution re-initiate the RA.

After the terminal device completes the random access process, for a terminal device in an idle state, after completing a series of procedures such as air interface security activation, the terminal device obtains a data bearer required for data transmission to establish a corresponding configuration, so as to perform data communication with the network device. For a terminal device in an inactive state or a connected state, after the random access process succeeds, the terminal device may perform data communication with the network device.

It should be noted that a two-step random access process is further introduced into the NR system. To be specific, the terminal device combines step S401 and step S403, and carries content of the original MSG 1 (optional) and the MSG 3 through a message A (MSG A). The network device combines step S402 and step S404, and carries content of the original MSG 2 and the MSG 4 through a message B (MSG B).

Uplink listen before talk (LBT) failure (UL LBT failure):

In an unlicensed-spectrum cell, before transmitting data, the terminal device needs to perform an LBT process. LBT is a channel access mechanism, and can enable wireless local area networks to effectively share a same spectrum resource. Availability of a channel in an unlicensed frequency band cannot be ensured in all time. Therefore, the LBT requires that before data transmission, the channel is first listened to, clear channel assessment is performed, and data transmission is performed only when it is ensured that the channel is idle.

If the LBT succeeds, this data transmission can be performed. If the LBT fails, this data transmission is abandoned, and the terminal device subsequently waits for a resource for retransmission.

An uplink LBT failure mechanism is introduced into the NR system. For example, the terminal device detects, by using a timer and a counter, whether an uplink LBT failure occurs. Specifically, each time it is determined that an uplink LBT failure occurs, the counter is iteratively increased by 1, and the timer is enabled. When the timer expires, the counter is reset. If a quantity of uplink LBT failures (a count value of the counter) reaches a preset maximum quantity of times, it is determined that a third event occurs.

Buffer Status Report (BSR)

In step S403 described above, when there is a remaining resource after the message 3 (MSG 3) includes the identification information of the terminal device, the message 3 may further include a MAC CE of the BSR, to indicate an amount of to-be-sent data on an LCG of the terminal device.

For example, in Assumption 2, it is assumed that the BSR includes an amount of to-be-sent data on the foregoing logical channel group LCG #1 and an amount of to-be-sent data on the foregoing logical channel group LCG #2. The logical channel group LCG #1 includes the logical channel LCH #4 used to carry the data of the eMBB service, and the logical channel group LCG #2 includes the logical channel LCH #5 used to carry the data of the URLLC service.

Based on the foregoing Assumption 1, if the network device does not indicate an SR configuration for the logical channel LCH #4, the logical channel LCH #4 has no available PUCCH resource for the SR. The network device indicates the SR configuration (the PUCCH resource #2) for the logical channel LCH #5, so that the logical channel LCH #5 has a PUCCH resource (the PUCCH resource #2) available for the SR. In the BSR, values of the amount of to-be-sent data on the logical channel group LCG #1 and the amount of to-be-sent data on the logical channel group LCG #2 have the following several cases:

Case 1: The amount of to-be-sent data on the logical channel group LCG #1 is not 0, but the amount of to-be-sent data on the logical channel group LCG #2 is 0. It indicates that there is data to be transmitted on the logical channel LCH #4 used to carry the data of the eMBB service. However, because the network device does not indicate an SR configuration for the logical channel LCH #4 (where there is no available PUCCH resource, in other words, the second event occurs), the terminal device requests an uplink resource through the RA. In this case, the network device does not need to reconfigure resources such as a PUCCH, a sounding reference signal (SRS), and a configured uplink grant (CG).

Case 2: The amount of to-be-sent data on the logical channel group LCG #2 is not 0, but the amount of to-be-sent data on the logical channel group LCG #1 is 0. It indicates that there is data to be transmitted on the logical channel LCH #5 used to carry the data of the URLLC service. However, because the quantity of transmissions of the SR reaches the maximum quantity of transmissions of the SR (that is, the first event occurs), the terminal device requests an uplink resource through the RA. In this case, the network device needs to reconfigure resources such as a PUCCH, an SRS, and a CG.

Case 3: The amount of to-be-sent data on the logical channel group LCG #1 and the amount of to-be-sent data on the logical channel group LCG #2 are not 0. In this case, the network device cannot determine whether the random access process is triggered by the first event or the second event. Because the random access process may be triggered by the first event, but the data of the eMBB service also needs to be sent before the message 3 (MSG 3) is sent. Alternatively, the random access process may be triggered by the second event, but the data of the URLLC service also needs to be sent before the message 3 (MSG 3) is sent.

Case 4: Due to a size limit of a remaining resource, the message 3 (MSG 3) cannot carry a MAC CE of a long BSR or a MAC CE of a truncated BSR, that is, cannot carry a BSR MAC CE. In this case, because transmission of the BSR is not completed, the network device cannot determine, based on an existing BSR, whether a subsequently to-be-transmitted BSR further indicates that data of another service needs to be sent. Therefore, the network device also cannot determine whether the random access process is triggered by the first event or the second event.

It can be learned from the foregoing Case 3 and Case 4 that the network device cannot determine whether the random access process is triggered by the first event or the second event. If the RA is triggered by the first event, the network device reconfigures resources such as a PUCCH, an SRS, and a CG. If the RA is triggered by the second event, the network device does not need to reconfigure resources such as a PUCCH, an SRS, and a CG. Therefore, when the RA is actually triggered by the second event, but the network device understands it as that the RA is triggered by the first event, the network device still reconfigures resources such as a PUCCH, an SRS, and a CG, thereby wasting air interface signaling. When the RA is actually triggered by the first event, but the network device understands it as that the RA is triggered by the second event, the network device cannot reconfigure resources such as a PUCCH, an SRS, and a CG in a timely manner. Consequently, the terminal device cannot re-obtain the resources in a timely manner and perform a related process, and system performance is affected.

An embodiment of this application provides an event processing method. When the first event or the second event occurs, the terminal device sends first indication information to the network device, where the first indication information indicates the RA triggered by the first event or the second event. Specifically, the terminal device may send the first indication information through an RRC layer, a MAC layer, and a physical layer. This resolves a problem that because the network device misunderstands occurrence of the first event or the second event, air interface signaling is wasted or the terminal device cannot re-obtain the foregoing resources in a timely manner, thereby affecting system performance.

Figure 6:
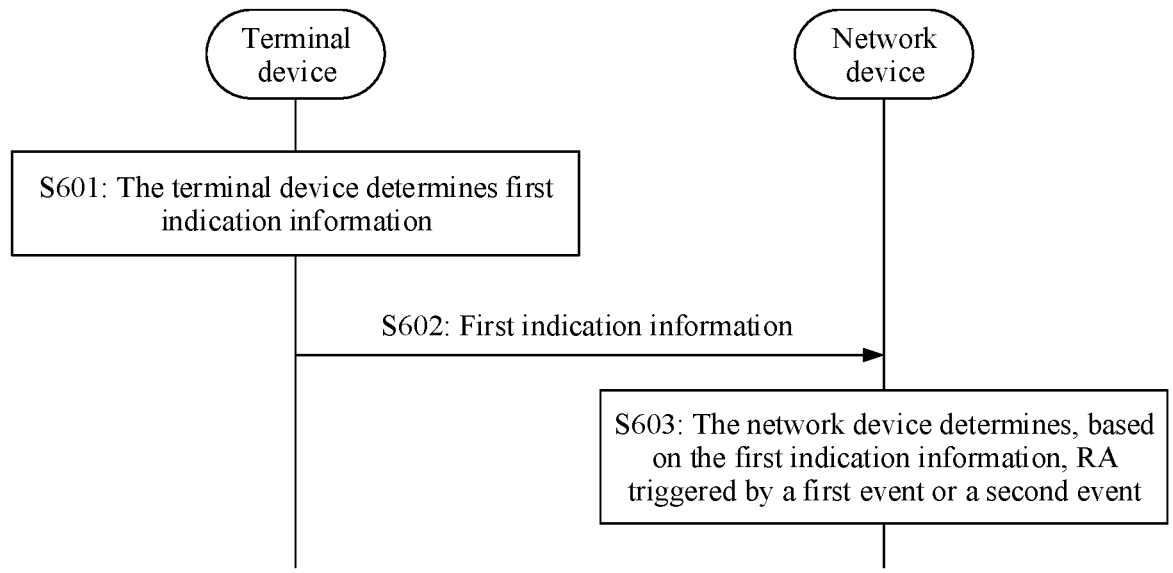
FIG. 6 is a schematic flowchart 1 of an event processing method according to an embodiment of this application.

Specifically, as shown in FIG. 6, an embodiment of this application provides an event processing method. The method includes the following steps.

S601: A terminal device determines first indication information.

The first indication information is used to indicate RA triggered by a first event or a second event.

As described above, the first event refers to that a quantity of transmissions of an SR (a count value of an SR counter) reaches a maximum quantity of transmissions of the SR. The second event refers to that for an SR that has been triggered and that is in a pending state, there is no available PUCCH resource.

Optionally, in another description manner, the first event may also be described as an RA event that triggers reconfiguration of at least one of the following resources, and the second event may also be described as an RA event in which the at least one of the following resources does not need to be reconfigured. The at least one resource includes:

PUCCH resource: The PUCCH resource includes a PUCCH resource of at least one serving cell including a local cell.

SRS resource: The SRS resource includes an SRS resource of at least one serving cell including a local cell.

PUSCH resource used for SP-CSI reporting: The PUSCH resource used for SP-CSI reporting includes a PUSCH resource used for SP-CSI reporting of at least one serving cell including a local cell.

Configured uplink grant (CG): The configured uplink grant includes a CG resource of at least one serving cell including a local cell.

Configured downlink assignment (CDA): The configured downlink assignment includes a CDA resource of at least one serving cell including a local cell.

Optionally, when the first event occurs, the terminal device may release the at least one resource.

Optionally, when the first event occurs, the terminal device may cancel all pending SRs.

Optionally, when the second event occurs, the terminal device may cancel the pending SR that triggers the second event, or may not cancel all pending SRs.

S602: The terminal device sends the first indication information.

Correspondingly, a network device receives the first indication information.

The first indication information may be included in a first message, and the first message may be the message 3 (MSG 3) in the foregoing four-step random access process or the message B (MSG B) in the foregoing two-step random access process.

Optionally, the first message may further include identification information of the terminal device, for example, a C-RNTI.

The first indication information may be indicated in the following several manners:

For sending the first indication information through an RRC layer:

Optionally, in a possible implementation, the first indication information may be indicated by an information element (IE) or a cause value of an RRC message.

For example, an RRC setup request message is used as an example. As shown in the following structure of the RRC setup request message, an enumerated value may be added to an IE information element (RRCSetupRequest-IEs) of the RRC setup request message as the first indication information, and different values of the enumerated value separately indicate the RA triggered by the first event or the second event. Alternatively, a cause value may be added to an establishment cause information element as the first indication information, and different values of the cause value separately indicate the RA triggered by the first event or the second event.

The following is a structure of an RRC setup request message:

```
RRCSetupRequest::=SEQUENCE{
    rrcSetupRequest              RRCSetupRequest-IEs
}
RRCSetupRequest-IEs::=SEQUENCE{
    ue-Identity                  InitialUE-Identity,
    establishmentCause           EstablishmentCause,
    first indication information         ENUMERATED{first
event, second event}
    spare                        BIT STRING (SIZE (1))
}
InitialUE-Identity::=CHOICE{
    ng-5G-S-TMSI-Part1           BIT STRING (SIZE (39)),
    randomValue                  BIT STRING (SIZE (39))
}
EstablishmentCause: :=ENUMERATED{
    emergency, highPriorityAccess, mt-Access, mo-Signalling,
    mo-Data, mo-VoiceCall, mo-VideoCall, mo-SMS,
mps-PriorityAccess, mcs-PriorityAccess, first event, second event,
    spare6, spare5, spare4, spare3, spare2, spare1
}
```

In another possible implementation, the first indication information may include second indication information or third indication information, and the second indication information or the third indication information is used to determine the RA triggered by the first event or the second event. The third indication information is used to indicate arrival of high-priority data (for example, data of a URLLC type), and fourth indication information is used to indicate arrival of low-priority data (for example, data of an eMBB type). Alternatively, the third indication information is used to indicate arrival of low-priority data (for example, data of an eMBB type), and fourth indication information is used to indicate arrival of high-priority data (for example, data of a URLLC type).

The network device may determine, with reference to the second indication information or the third indication information and other information such as a BSR, the RA triggered by the first event or the second event.

Optionally, the network device may configure arrival of high-priority data or arrival of low-priority data. For example, the network device may configure, through the RRC message, that low-priority data arrives when data arrives on a logical channel LCH #4, and configure, through the RRC message, that high-priority data arrives when data arrives on a logical channel LCH #5. Alternatively, the network device may configure a threshold of a logical channel priority through the RRC message. When data arrives on a logical channel whose priority is higher than the threshold, high-priority data arrives; or when data arrives on a logical channel whose priority is lower than the threshold, low-priority data arrives.

Based on the foregoing Assumption 1, if the network device does not indicate an SR configuration for the logical channel LCH #4, the logical channel LCH #4 has no available PUCCH resource for the SR. The network device indicates an SR configuration (a PUCCH resource #2) for the logical channel LCH #5, so that the logical channel LCH #5 has a PUCCH resource (the PUCCH resource #2) available for the SR. In Case 3, the amount of to-be-sent data on the logical channel group LCG #1 and the amount of to-be-sent data on the logical channel group LCG #2 are not 0. If the second indication information indicates that the high-priority data arrives, the network device may determine the RA triggered by the first event. If the third indication information indicates that the low-priority data arrives, the network device may determine the RA triggered by the second event. In this implementation, the first indication information is implicitly indicated.

For example, an RRC setup request message is used as an example. As shown in the following structure of the RRC setup request message, an enumerated value may be added to an IE information element (RRCSetupRequest-IEs) of the RRC setup request message as the first indication information, and different values of the enumerated value separately indicate the second indication information or the third indication information. Alternatively, a cause value may be added to an establishment cause (EstablishmentCause) information element as the first indication information, and different values of the cause value separately indicate the second indication information or the third indication information.

The following is a structure of an RRC setup request message:

```
RRCSetupRequest::=SEQUENCE{
    rrcSetupRequest              RRCSetupRequest-IEs
}
RRCSetupRequest-IEs::=SEQUENCE{
    ue-Identity                  InitialUE-Identity,
    establishmentCause           EstablishmentCause,
    first indication information         ENUMERATED {second
indication information, third indication information}
    spare                        BIT STRING (SIZE (1))
}
InitialUE-Identity::=CHOICE{
    ng-5G-S-TMSI-Part1           BIT STRING (SIZE (39)),
    randomValue                  BIT STRING (SIZE (39))
}
Establishmentcause::=ENUMERATED {
    emergency, highPriorityAccess, mt-Access, mo-Signalling,
    mo-Data, mo-VoiceCall, mo-VideoCall, mo-SMS,
mps-PriorityAccess, mcs-PriorityAccess, second indication information,
third indication information,
    spare6, spare5, spare4, spare3, spare2, spare1
}
```

Figure 7:
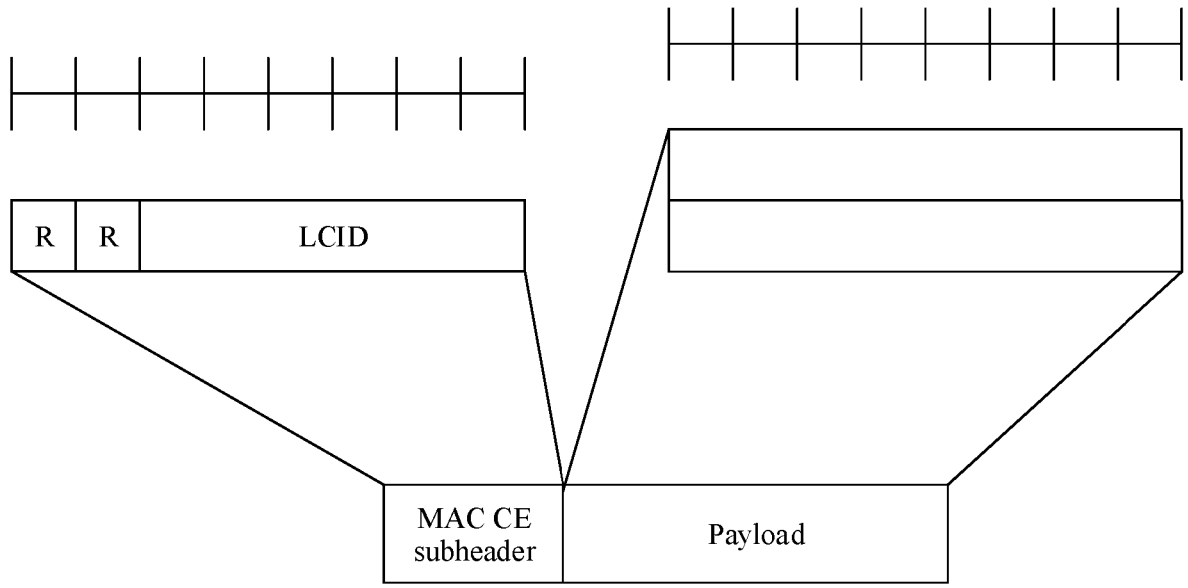
FIG. 7 is a schematic structural diagram 1 of a MAC CE according to an embodiment of this application.

For sending the first indication information through a MAC layer:

In a possible implementation, FIG. 7 is a schematic structural diagram of a MAC CE. The MAC CE includes a MAC CE subheader and a payload, and the MAC CE subheader includes a reserved bit (reserved, R) and a logical channel identifier (LCID). The first indication information may be indicated by the LCID, the reserved bit R, or the payload in the MAC CE.

Figure 8:
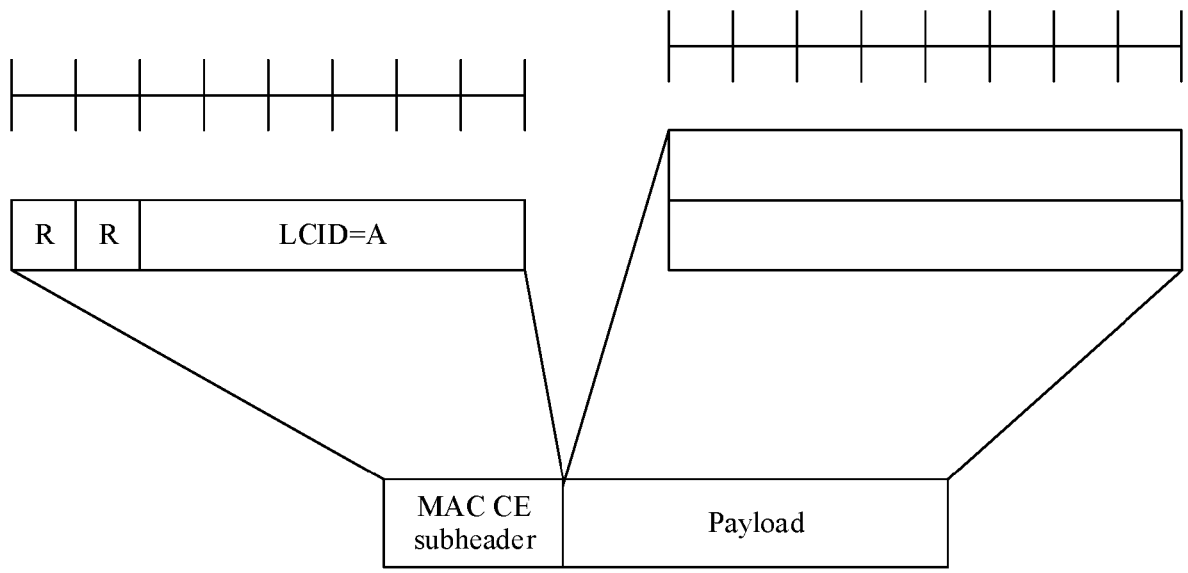
FIG. 8 is a schematic structural diagram 2 of a MAC CE according to an embodiment of this application.

Optionally, when the first indication information is indicated by the LCID, the RA triggered by the first event or the second event may be indicated by two different values of the LCID. For example, as shown in FIG. 8 and Table 1, values A of the LCID may be two values that are not used currently in 33 to 51. For example, when the value A of the LCID is 33, the RA triggered by the first event is indicated, or when the value A of the LCID is 34, the RA triggered by the second event is indicated.

Optionally, whether there is the first indication information in the MAC CE may indicate the RA triggered by the first event or the second event. For example, when there is no first indication information in the MAC CE, the first event is indicated, or when there is the first indication information, the second event is indicated. Alternatively, when there is the first indication information in the MAC CE, the first event is indicated, or when there is no first indication information, the second event is indicated.

Figure 9:
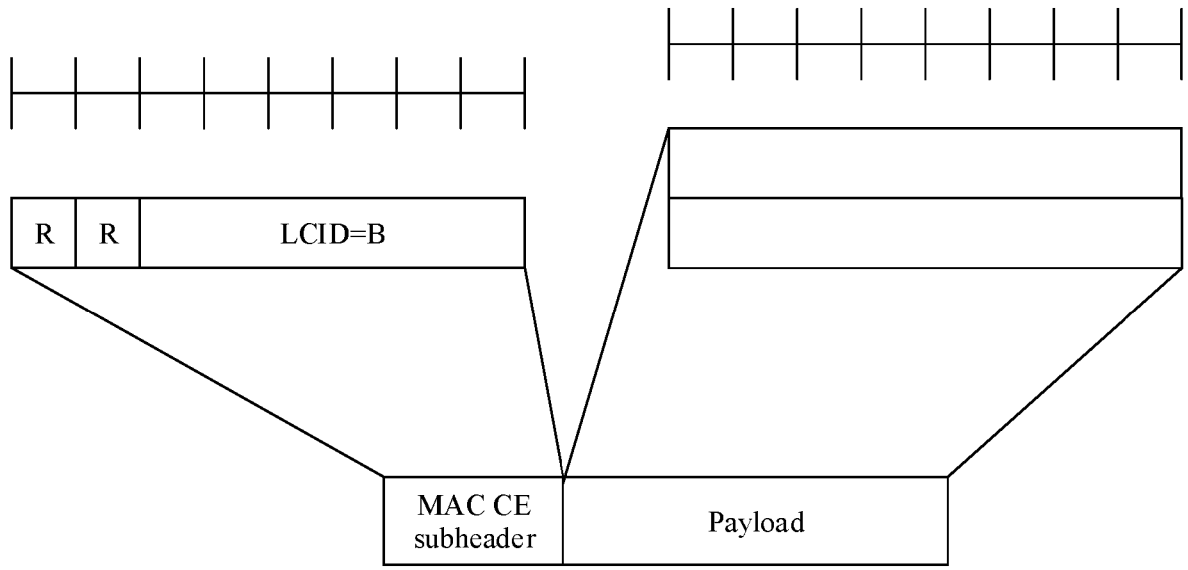
FIG. 9 is a schematic structural diagram 3 of a MAC CE according to an embodiment of this application.

Optionally, when the first indication information is indicated by the LCID, the RA triggered by the first event or the second event may be indicated based on whether the first message includes a preset MAC CE. For example, when the first message includes the preset MAC CE, the RA triggered by the first event is indicated; or when the first message does not include the preset MAC CE, the RA triggered by the second event is indicated. Alternatively, when the first message includes the preset MAC CE, the RA triggered by the second event is indicated; or when the first message does not include the preset MAC CE, the RA triggered by the first event is indicated. As shown in FIG. 9 and Table 1, the preset MAC CE refers to a MAC CE including an LCID whose value is B. The value B may be a value that is not used currently in 33 to 51.

TABLE 1

| Index (value of the LCID) | Meaning of the LCID |
| --- | --- |
| 0 | 64-bit CCCH |
| 1-32 | Identifier of an LCH |
| A (33-51)/B (33-51) | First indication information |
| 52 | 48-bit CCCH |
| 53 | Recommended bit rate query |
| 54 | Multi-entry power headroom reporting |
| 55 | CG confirmation |
| 56 | Multi-entry power headroom reporting |
| 57 | Single-entry power headroom reporting |
| 58 | C-RNTI |
| 59 | Short truncated BSR |
| 60 | Long truncated BSR |
| 61 | Short BSR |
| 62 | Long BSR |
| 63 | Padding |

It should be noted that when the first indication information is indicated by the LCID, the MAC CE may include only the MAC subheader part, and does not include the payload part.

Figure 10:
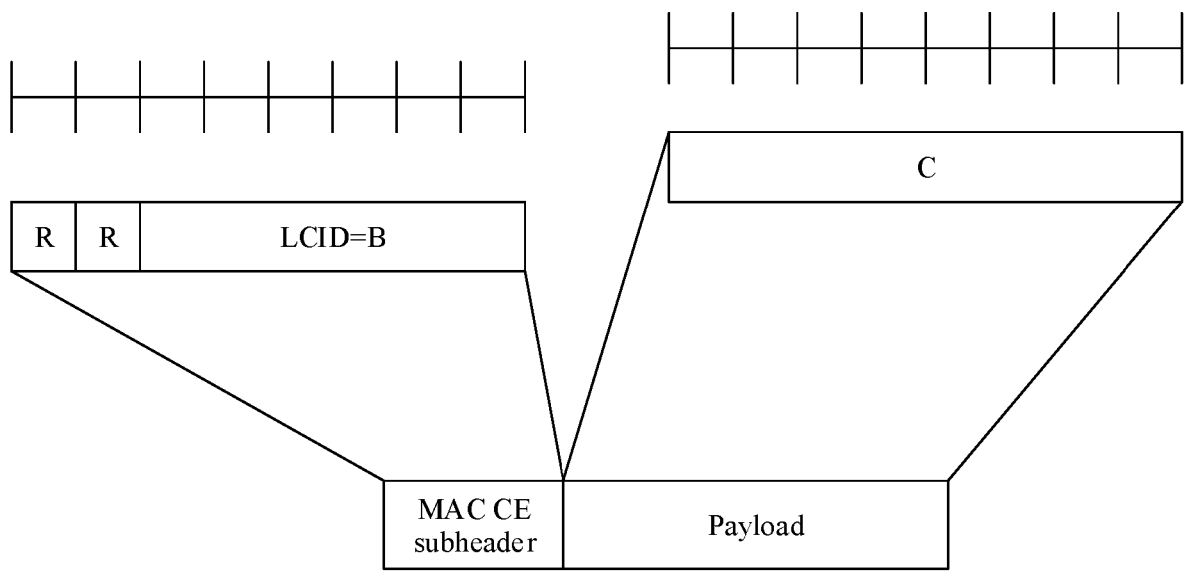
FIG. 10 is a schematic structural diagram 4 of a MAC CE according to an embodiment of this application.
Figure 11:
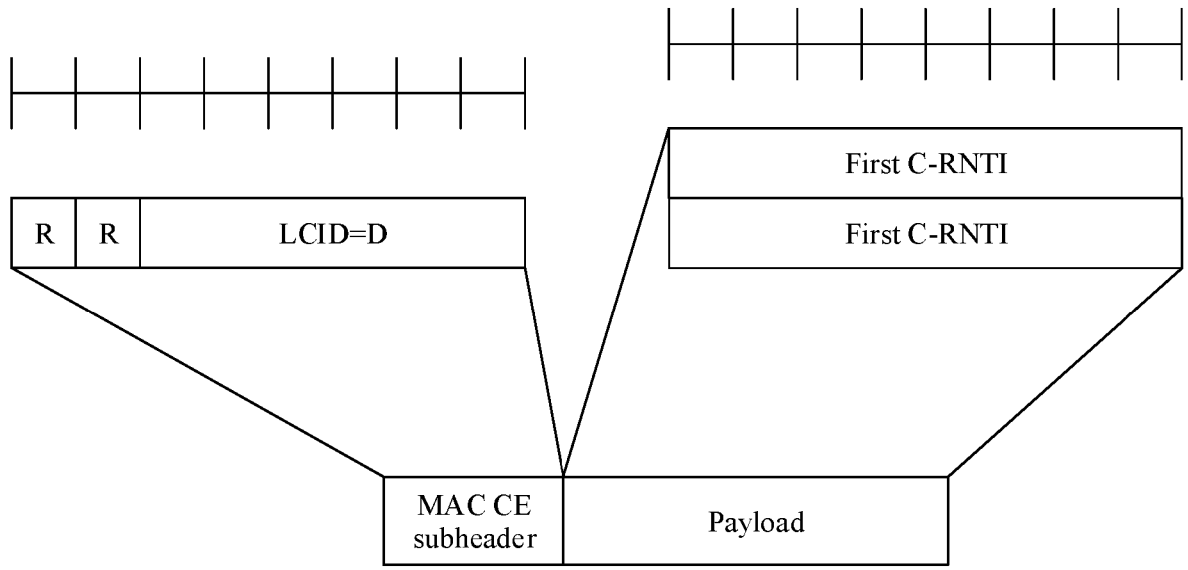
FIG. 11 is a schematic structural diagram 5 of a MAC CE according to an embodiment of this application.

Optionally, when the first indication information is indicated by the payload in the MAC CE, the RA triggered by the first event or the second event may be indicated by two different values of the payload. For example, as shown in FIG. 10 and Table 1, the value B of the LCID may be a value that is not used currently in 33 to 51. Values C of the payload may be any two values in a numerical range that can be indicated by the payload.

Optionally, when the first indication information is indicated by the LCID, or when the first indication information is indicated by the payload in the MAC CE, the first indication information may be further used to indicate that the payload in the MAC CE is a first C-RNTI.

As shown in FIG. 10 and Table 2, a value D of the LCID may be a value that is not used currently in 33 to 51, a corresponding payload is the first C-RNTI, and a payload corresponding to an existing value 58 of the LCID is a second C-RNTI.

The network device may determine, based on whether the value of the LCID is D or 58, the RA triggered by the first event or the second event. For example, when the value of the LCID is D, the RA triggered by the first event is indicated; or when the value of the LCID is 58, the RA triggered by the second event is indicated. Alternatively, when the value of the LCID is D, the RA triggered by the second event is indicated; or when the value of the LCID is 58, the RA triggered by the first event is indicated.

Alternatively, the network device may also determine, based on whether the payload is the first C-RNTI or the second C-RNTI, the RA triggered by the first event or the second event. For example, when the payload is the first C-RNTI, the RA triggered by the first event is indicated, or when the payload is the second C-RNTI, the RA triggered by the second event is indicated. Alternatively, when the payload is the first C-RNTI, the RA triggered by the second event is indicated, or when the payload is the second C-RNTI, the RA triggered by the first event is indicated.

TABLE 2

| Index (value of the LCID) | Meaning of the LCID |
| --- | --- |
| 0 | 64-bit CCCH |
| 1-32 | Identifier of an LCH |
| D | First C-RNTI |
| 52 | 48-bit CCCH |
| 53 | Recommended bit rate query |
| 54 | Multi-entry power headroom reporting |
| 55 | CG confirmation |
| 56 | Multi-entry power headroom reporting |
| 57 | Single-entry power headroom reporting |
| 58 | Second C-RNTI |
| 59 | Short truncated BSR |
| 60 | Long truncated BSR |
| 61 | Short BSR |
| 62 | Long BSR |
| 63 | Padding |

Optionally, when the first indication information is indicated by the reserved bit R, the RA triggered by the first event or the second event may be indicated based on different values of one of reserved bits. For example, when a value of the one of reserved bits is 0, the RA triggered by the first event is indicated, or when the reserved bit is 1, the RA triggered by the second event is indicated. Alternatively, when a value of the reserved bit is 1, the RA triggered by the first event is indicated, or when the reserved bit is 0, the RA triggered by the second event is indicated. The reserved bit may be the first reserved bit or the second reserved bit.

Figure 12:
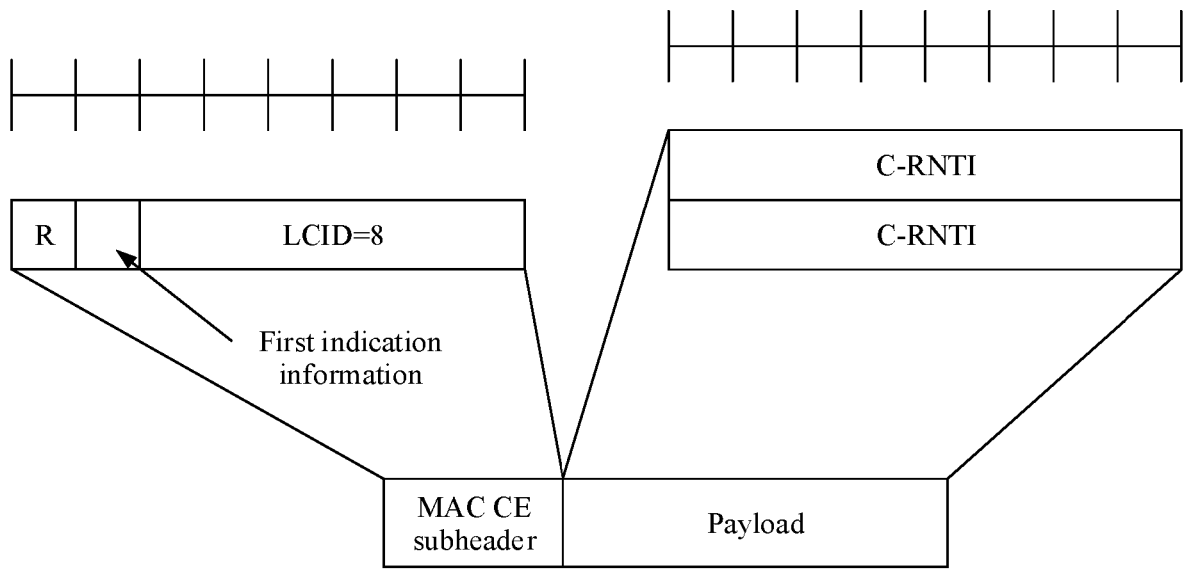
FIG. 12 is a schematic structural diagram 6 of a MAC CE according to an embodiment of this application.

In addition, as shown in FIG. 12, when the first indication information is indicated by the reserved bit R, the value of the LCID may be 58, that is, the payload may be the C-RNTI.

It should be noted that the RA triggered by the first event or the second event may also be indicated by two reserved bits. For example, values "01" of the two reserved bits indicate the RA triggered by the first event, and values "10" of the two reserved bits indicate the RA triggered by the second event. This is not limited in this application.

In another possible implementation, the first indication information may be indicated by a BSR in the RA. Specifically, the first indication information may be indicated by the message 3 (MSG 3) in the four-step random access process, or may be indicated by the message B (MSG B) in the two-step random access process.

In amounts of to-be-sent data on all LCGs in the BSR, when the RA is triggered by the first event, an amount of to-be-sent data on an LCG corresponding to an LCH that has no available PUCCH resource is set to 0. Alternatively, when the RA is triggered by the second event, an amount of to-be-sent data on an LCG corresponding to at least one least one LCH that has an available PUCCH resource is set to 0. In other words, an amount of to-be-sent data on an LCG corresponding to an LCH that does not trigger the RA is forcibly set to 0, and an amount of to-be-sent data on an LCG corresponding to an LCH that triggers the RA is reserved. The network device may determine, with reference to an uplink resource parameter configured for a corresponding LCH, the RA triggered by the first event or the second event.

For sending the first indication information through a physical layer:

In still another possible implementation, the first indication information may be indicated by different random access channel (RACH) resources. The terminal device selects, based on the first event or the second event that triggers the RA, different RACH resources to perform a random access process, to indicate the RA triggered by the first event or the second event.

The RACH resource may include at least one of the following resources:

Random access preamble: Different values of the random access preamble may indicate the RA triggered by the first event or the second event. Optionally, random access preambles may be divided into two groups, and the RA triggered by the first event or the second event is indicated by random access preambles belonging to different groups. For example, a random access preamble in the first group indicates the RA triggered by the first event, and a random access preamble in the second group indicates the RA triggered by the second event. Alternatively, a random access preamble in the first group indicates the RA triggered by the second event, and a random access preamble in the second group indicates the RA triggered by the first event.

RACH slot: The RA triggered by the first event or the second event may be indicated by different RACH slots.

In still another possible implementation, the first indication information is indicated by uplink control information (UCI) in the PUCCH resource.

The network device may configure at least one PUCCH resource for the terminal device, to transmit the UCI.

Optionally, the RA triggered by the first event or the second event may be indicated based on different values of the UCI in the PUCCH resource. For example, when the UCI uses a first value, the RA triggered by the first event is indicated, or when the UCI uses a second value, the RA triggered by the second event is indicated. Alternatively, when the UCI uses a second value, the RA triggered by the first event is indicated, or when the UCI uses a first value, the RA triggered by the second event is indicated.

Optionally, the RA triggered by the first event or the second event may be indicated based on different resources occupied by the UCI in the PUCCH resource. For example, when the UCI occupies a first resource in the PUCCH resource, the RA triggered by the first event is indicated, or when the UCI occupies a second resource in the PUCCH resource, the RA triggered by the second event is indicated. Alternatively, when the UCI occupies a second resource in the PUCCH resource, the RA triggered by the first event is indicated, or when the UCI occupies a first resource in the PUCCH resource, the RA triggered by the second event is indicated.

Optionally, the RA triggered by the first event or the second event may be indicated based on whether the UCI exists in the PUCCH resource. For example, when there is no UCI in the PUCCH resource, the RA triggered by the first event is indicated, or when there is the UCI in the PUCCH resource, the RA triggered by the second event is indicated. Alternatively, when there is the UCI in the PUCCH resource, the RA triggered by the first event is indicated, or when there is no UCI in the PUCCH resource, the RA triggered by the second event is indicated.

S603: The network device determines, based on the first indication information, the RA triggered by the first event or the second event.

The process in which the network device determines, based on the first indication information, the RA triggered by the first event or the second event is an inverse process of the process in which the terminal device indicates the first indication information in step S602. This is not repeated herein.

According to the event processing method provided in this embodiment of this application, the terminal device sends the first indication information to the network device, where the first indication information is used to indicate the RA triggered by the first event or the second event, so as to prevent a waste of air interface signaling or impact on system performance that occurs because the network device misunderstands occurrence of the first event or the second event and uses an incorrect processing manner for an uplink resource.

An embodiment of this application provides another event processing method. A network device configures, for a terminal device, a plurality of available PUCCH resources for an SR. When a first event occurs on a first PUCCH resource, the terminal device may send the SR by using a second PUCCH resource. This can avoid RA triggered by the first event, allow RA triggered by a second event, and prevent a waste of air interface signaling or impact on system performance that occurs because the network device misunderstands occurrence of the first event or the second event and uses an incorrect processing manner for an uplink resource.

Figure 13:
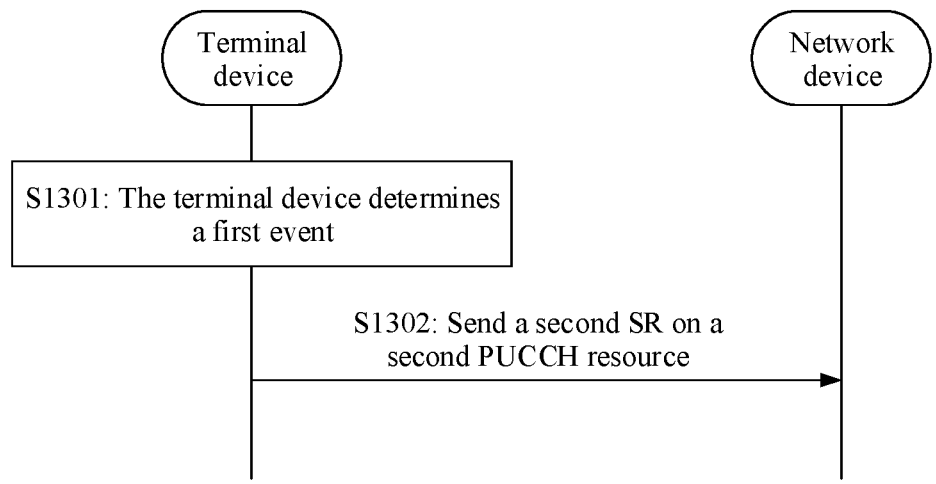
FIG. 13 is a schematic flowchart 2 of an event processing method according to an embodiment of this application.

Specifically, as shown in FIG. 13, an embodiment of this application provides an event processing method. The method includes the following steps.

S1301: A terminal device determines a first event.

The first event refers to that a quantity of transmissions of a first SR reaches a maximum quantity of transmissions of an SR. The first SR is carried on a first PUCCH resource.

S1302: The terminal device sends a second SR on a second PUCCH resource.

Correspondingly, a network device receives the second SR on the second PUCCH resource.

Serving cells belonging to a same timing advance group (TAG) have a same timing advance, and serving cells belonging to different TAGs may have different timing advances.

A cell to which the second PUCCH resource belongs and a cell to which the first PUCCH resource belongs may belong to different TAGs. For example, the first PUCCH resource is a PUCCH resource of at least one cell associated with a TAG 1, the second PUCCH resource is a PUCCH resource of at least one cell associated with a TAG 2, and the TAG 1 and the TAG 2 are different TAGs.

Alternatively, the cell to which the second PUCCH resource belongs and a primary serving cell belong to different TAGs (for example, secondary TAGs).

That the terminal device fails to send the SR in the cell to which the first PUCCH resource belongs or the primary serving cell indicates that a problem occurs in uplink timing of the cell to which the first PUCCH resource belongs or the primary serving cell, but does not indicate that a problem occurs in uplink timing of a cell in another TAG. Therefore, the terminal device can attempt to send the SR by using a PUCCH resource of the cell in the another TAG.

Optionally, the second PUCCH resource may be associated with one or more LCHs, or may not be associated with any LCH.

Optionally, when the first event occurs, the terminal device may release an uplink resource and/or a configured downlink assignment of at least one serving cell that belongs to a first TAG, where the first TAG is a TAG of the cell to which the first PUCCH resource belongs. Specifically, the uplink resource includes at least one of the following resources: a PUCCH resource, an SRS resource, a PUSCH resource used for SP-CSI reporting, and a configured uplink grant. The configured downlink assignment is usually associated with semi-persistent scheduling.

The PUCCH resource includes a PUCCH resource of at least one serving cell associated with the first TAG corresponding to the first PUCCH resource. In this case, it is assumed that the first PUCCH resource and the second PUCCH resource belong to cells in different TAGs.

The SRS resource includes an SRS resource of at least one serving cell associated with the first TAG corresponding to the first PUCCH resource.

The PUSCH resource used for SP-CSI reporting includes a PUSCH resource of at least one serving cell associated with the first TAG corresponding to the first PUCCH resource.

The configured uplink grant includes a configured uplink grant resource of at least one serving cell associated with the first TAG corresponding to the first PUCCH resource.

The configured downlink assignment includes a configured downlink assignment of at least one serving cell associated with the first TAG corresponding to the first PUCCH resource.

According to the event processing method provided in this embodiment of this application, when determining that the first event occurs on the first PUCCH resource, the terminal device sends the second SR on the second PUCCH resource, so that RA triggered by the first event can be avoided, and RA triggered by a second event is allowed, so as to prevent a waste of air interface signaling or impact on system performance that occurs because the network device misunderstands occurrence of the first event or the second event and uses an incorrect processing manner for the uplink resource.

An embodiment of this application provides another event processing method. When a first event triggers RA, a pending SR that triggers the first event is canceled. When a second event triggers RA, after the RA is completed, an SR that triggers the second event and that is in a pending state is canceled. When the RA is triggered by the first event or the second event, the SR is canceled, thereby preventing RA triggered by concurrent first events or second events from affecting each other, and further preventing impact on a service of another cell in which the first event does not occur.

Figure 14:
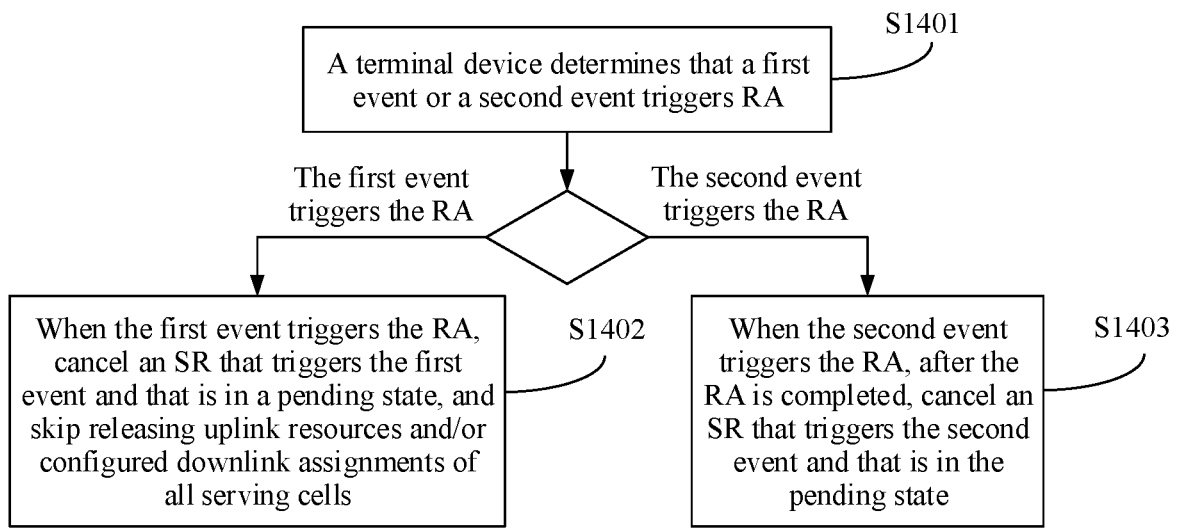
FIG. 14 is a schematic flowchart 3 of an event processing method according to an embodiment of this application.

Specifically, as shown in FIG. 14, an embodiment of this application provides an event processing method. The method includes the following steps.

S1401: A terminal device determines that a first event or a second event triggers RA.

The first event refers to that a quantity of transmissions of an SR reaches a maximum quantity of transmissions of the SR. The second event refers to that for an SR that has been triggered and that is in a pending state, there is no available PUCCH resource.

S1402: When the first event triggers the RA, an SR that triggers the first event and that is in the pending state is canceled, and uplink resources and/or configured downlink assignments of all serving cells are not released.

The uplink resource includes at least one of the following resources: a PUCCH resource, an SRS resource, a PUSCH resource used for SP-CSI reporting, and a configured uplink grant. The configured downlink assignment is usually associated with semi-persistent scheduling.

The PUCCH resource includes a PUCCH resource of at least one serving cell including a local cell.

The SRS resource includes an SRS resource of at least one serving cell including a local cell.

The PUSCH resource used for SP-CSI reporting includes a PUSCH resource used for SP-CSI reporting of at least one serving cell including a local cell.

The configured uplink grant includes a configured uplink grant resource of at least one serving cell including a local cell.

The configured downlink assignment includes a configured downlink assignment of at least one serving cell including a local cell.

Optionally, when the first event triggers the RA, an uplink resource and/or a configured downlink assignment of at least one serving cell that belongs to a first timing advance group TAG is released, where the first TAG is a TAG of a cell corresponding to an LCH that triggers the first event.

In the prior art, when the first event triggers the RA, all pending SRs are canceled. In this application, only the pending SR that triggers the first event is canceled, so that the SR triggered by the second event still has an opportunity to be transmitted instead of being canceled because of the RA triggered by the first event. Therefore, a network device can obtain more information to perform better scheduling. In addition, the foregoing resources of another cell in which the first event does not occur are still valid, so that data of a high-priority (for example, URLLC) service can be sent in a timely manner, and an SR failure of a current cell does not affect transmission of the another cell.

S1403: When the second event triggers the RA, after the RA is completed, the SR that triggers the second event and that is in the pending state is canceled.

When the second event triggers the RA, the terminal device may not cancel the SR that triggers the second event and that is in the pending state, and after the RA is completed, the terminal device cancels the SR that triggers the second event and that is in the pending state. This avoids that the RA triggered by the second event is interrupted by other RA. Therefore, more transmission opportunities are provided for the RA triggered by the second event.

According to the event processing method provided in this embodiment of this application, when the first event triggers the RA, the pending SR that triggers the first event is canceled, and the uplink resources and/or the configured downlink assignments of all serving cells are not released, so that the SR triggered by the second event still has an opportunity to be transmitted instead of being canceled because of the RA triggered by the first event. When the second event triggers the RA, the SR that triggers the second event and that is in the pending state is canceled after the RA is completed, so as to avoid that the RA triggered by the second event is interrupted by other RA. Therefore, more transmission opportunities are provided for the RA triggered by the second event. When the RA is triggered by the first event or the second event, the SR is canceled, thereby preventing RA triggered by concurrent first events or second events from affecting each other, and further preventing impact on a service of another cell in which the first event does not occur.

When a third event (that is, a quantity of uplink LBT failures reaches a preset maximum quantity of times) occurs in a cell or at least one BWP in a cell, RA is also triggered. The network device cannot determine whether the RA is triggered by the third event, and cannot determine a specific cell or BWP in which the third event occurs. An embodiment of this application provides still another event processing method. When a third event triggers RA, a terminal device indicates, to a network device, a cell in which the third event occurs, and may further indicate, to the network device, a BWP in which the third event occurs.

Figure 15:
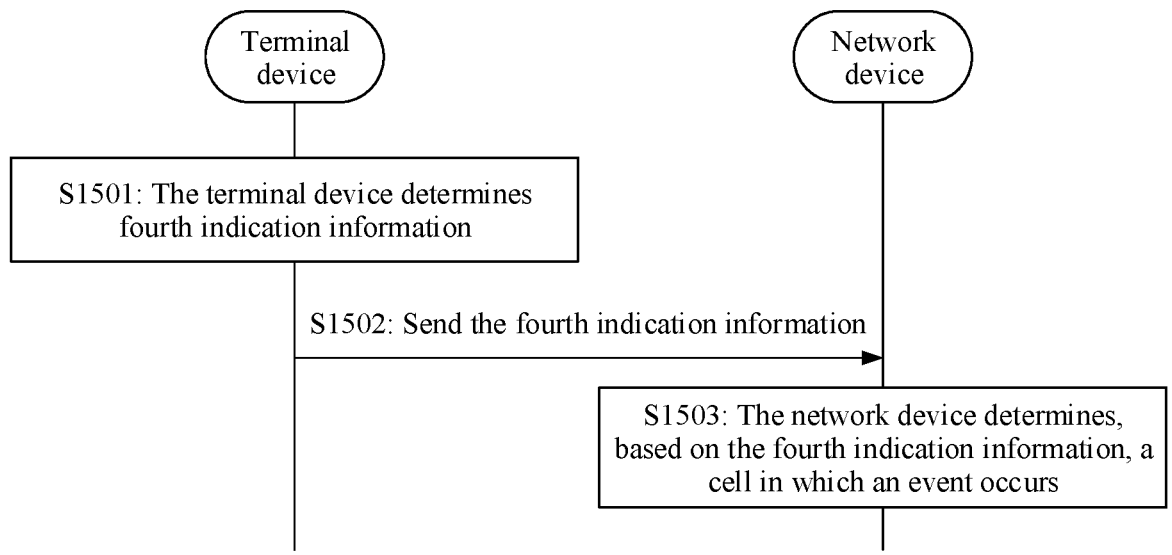
FIG. 15 is a schematic flowchart 4 of an event processing method according to an embodiment of this application.

As shown in FIG. 15, an embodiment of this application provides an event processing method. The method includes the following steps.

S1501: A terminal device determines fourth indication information.

The fourth indication information is used to indicate a cell in which a third event occurs, and the third event refers to that a quantity of uplink LBT failures reaches a preset maximum quantity of times.

Optionally, the terminal device may further determine fifth indication information, where the fifth indication information is used to indicate a BWP in which the third event occurs.

One cell may correspond to one or more BWPs, and one of the BWPs may be activated in the cell. In this case, the terminal device indicates, to a network device, the cell in which the third event occurs, in other words, indicates the BWP in which the third event occurs. If a plurality of BWPs are activated in the cell, in addition to indicating, to the network device, the cell in which the third event occurs, the terminal device further indicates the BWP in which the third event occurs, so that the network device can determine the BWP in which the third event occurs.

S1502: The terminal device sends the fourth indication information.

Correspondingly, the network device receives the fourth indication information.

For example, if the third event occurs in a secondary cell (SCell), because an uplink status of a primary cell (PCell) may be relatively good, the terminal device may send the fourth indication information to the network device, so that RA is not triggered. This step may also be referred to as that the terminal device sends an uplink LBT failure report.

Optionally, the fourth indication information may be indicated by a MAC CE. Specifically, the fourth indication information may be included in a payload of the MAC CE or a subheader of the MAC CE. This is not limited in this application. In this application, that the fourth indication information is included in the payload of the MAC CE is used as an example, but is not intended to be limited thereto.

Figure 16:
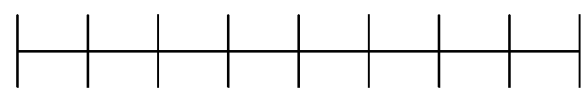
FIG. 16 is a schematic structural diagram 1 of a payload of a MAC CE according to an embodiment of this application.
Figure 16:
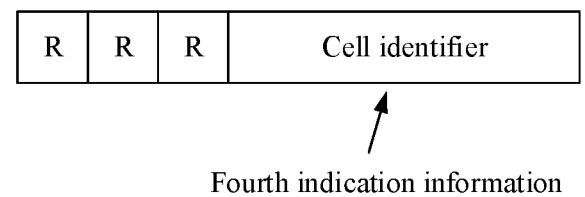

Optionally, the fourth indication information may be an identifier of the cell in which the third event occurs. That is, the fourth indication information explicitly indicates the cell in which the third event occurs. For example, as shown in FIG. 16, a possible structure of the payload of the MAC CE includes a reserved bit R and the identifier of the cell in which the third event occurs, and the identifier of the cell in which the third event occurs is the fourth indication information.

Figure 17:
FIG. 17 is a schematic structural diagram 2 of a payload of a MAC CE according to an embodiment of this application.
Figure 17:
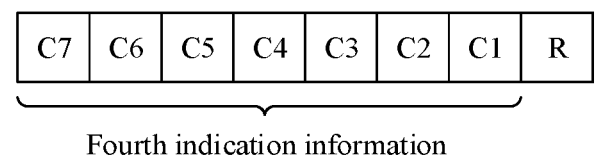

Optionally, the fourth indication information may be a bitmap, and the cell in which the third event occurs corresponds to one bit in the bitmap, so that the network device can determine, based on a position status of the bit in the bitmap, the cell in which the third event occurs. For example, as shown in FIG. 17, a possible structure of the payload of the MAC CE includes a reserved bit R and a bitmap. The bitmap includes seven bits: C1 to C7, and each bit corresponds to one cell. For example, all bits in the bitmap are set to 0 by default. When one of the bits is set to 1, it indicates that the third event occurs in a corresponding cell, and the third event does not occur in a cell corresponding to a bit that is not set to 1. Alternatively, all bits in the bitmap are set to 1 by default. When one of the bits is set to 0, it indicates that the third event occurs in a corresponding cell, and the third event does not occur in a cell corresponding to a bit that is not set to 0.

Optionally, the terminal device may further send the fifth indication information. The fifth indication information may also be indicated by the MAC CE. Specifically, the fifth indication information may also be included in the payload of the MAC CE or the subheader of the MAC CE. This is not limited in this application. In this application, that the fifth indication information is included in the payload of the MAC CE is used as an example, but is not intended to be limited thereto.

Figure 18:
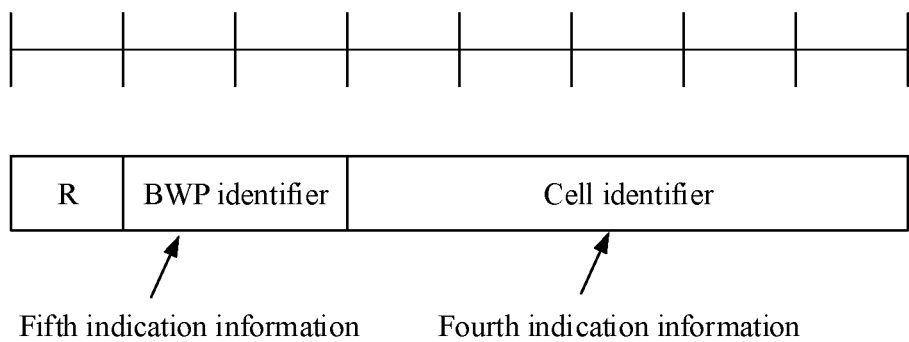
FIG. 18 is a schematic structural diagram 3 of a payload of a MAC CE according to an embodiment of this application.
Figure 19:
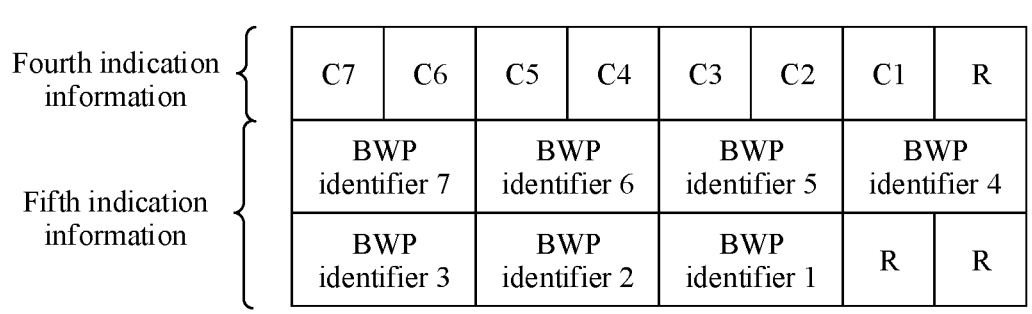
FIG. 19 is a schematic structural diagram 4 of a payload of a MAC CE according to an embodiment of this application.

Optionally, the fifth indication information may be an identifier of the BWP in which the third event occurs. That is, the fifth indication information explicitly indicates the BWP in which the third event occurs. For example, as shown in FIG. 18, a possible structure of the payload of the MAC CE includes a reserved bit R, the identifier of the BWP in which the third event occurs, and the identifier of the cell in which the third event occurs. Alternatively, as shown in FIG. 19, a possible structure of the payload of the MAC CE includes a reserved bit R, the identifier of the BWP in which the third event occurs, and the bitmap corresponding to the fourth indication information. BWP identifiers may be sorted in ascending or descending order of positions of cells to which the BWP identifiers belong. For example, a BWP corresponding to a BWP identifier 7 belongs to a cell corresponding to a bit C7, a BWP corresponding to a BWP identifier 6 belongs to a cell corresponding to a bit C6, a BWP corresponding to a BWP identifier 5 belongs to a cell corresponding to a bit C5, a BWP corresponding to a BWP identifier 4 belongs to a cell corresponding to a bit C4, a BWP corresponding to a BWP identifier 3 belongs to a cell corresponding to a bit C3, a BWP corresponding to a BWP identifier 2 belongs to a cell corresponding to a bit C2, and a BWP corresponding to a BWP identifier 1 belongs to a cell corresponding to a bit C1. Alternatively, a BWP corresponding to a BWP identifier 7 belongs to a cell corresponding to a bit C1, a BWP corresponding to a BWP identifier 6 belongs to a cell corresponding to a bit C2, a BWP corresponding to a BWP identifier 5 belongs to a cell corresponding to a bit C3, a BWP corresponding to a BWP identifier 4 belongs to a cell corresponding to a bit C4, a BWP corresponding to a BWP identifier 3 belongs to a cell corresponding to a bit C5, a BWP corresponding to a BWP identifier 2 belongs to a cell corresponding to a bit C6, and a BWP corresponding to a BWP identifier 1 belongs to a cell corresponding to a bit C7.

Optionally, after the third event occurs, in addition to sending the fourth indication information and the fifth indication information, the terminal device may further perform at least one of the following operations:

pending transmission of at least one signaling radio bearer (SRB) and data radio bearer (DRB) of the cell in which the third event occurs;

pending transmission of at least one SRB and DRB of the BWP in which the third event occurs;

deactivating the cell in which the third event occurs; and deactivating the BWP in which the third event occurs.

Optionally, after the third event occurs, the terminal device may further perform at least one of the following operations:
- determining to send a UL-SCH not through the cell in which the third event occurs or the BWP in which the third event occurs;
- determining to send the RA not through the cell in which the third event occurs or the BWP in which the third event occurs;
- determining to send a PUCCH not through the cell in which the third event occurs or the BWP in which the third event occurs;
- determining to send an SRS not through the cell in which the third event occurs or the BWP in which the third event occurs;
- determining to send CSI not through the cell in which the third event occurs or the BWP in which the third event occurs;
- stopping an SCell deactivation timer of the cell in which the third event occurs;
- stopping a BWP inactivity timer of the BWP in which the third event occurs;
- clearing a configured uplink grant of the cell in which the third event occurs or the BWP in which the third event occurs; and
- pending the configured uplink grant of the cell in which the third event occurs or the BWP in which the third event occurs.

The BWP in which the third event occurs is switched to an initial BWP or a default BWP, where the initial BWP is a BWP that is configured by the network device through a system message and that is used by the terminal device to initiate initial access in an idle state or an inactive state. When the terminal device enters a connected state, the network device may configure a dedicated BWP for data communication, and the initial BWP may be different from the dedicated BWP. The default BWP is a BWP configured by the network device for the terminal device, and is used to switch from the dedicated BWP to the default BWP when the BWP inactivity timer expires (to be specific, downlink control information (DCI) scheduled by the network device is not received for a long time), so that the network device and the terminal device can complete BWP alignment again. In this way, data communication is performed on the default BWP. The default BWP may be the same as or different from the dedicated BWP.

Optionally, the terminal device may further determine to send data not through the uplink grant of the cell in which the third event occurs or the BWP of the cell in which the third event occurs. The data includes at least one of the following:
- a MAC CE, including at least one of the following: a BSR MAC CE, a power headroom report (PHR) MAC CE, and an uplink failure (UL failure) MAC CE;
- SRB data, including at least one of the following: an SRB 0, an SRB 1, an SRB 2, and an SRB 3;
- DRB data, including at least one of the following: all DRB data, high-priority data, and DRB data corresponding to a specified LCH or LCG; and a control protocol data unit (PDU), including at least one of the following: a service data adaptation protocol (SDAP) control PDU, and a radio link control (RLC) status report or a packet data convergence protocol (PDCP) status report.

It should be noted that the network device may preconfigure whether the MAC CE, the SRB, the DRB, or the control PDU can be transmitted through the cell in which the third event occurs. The terminal device may determine, based on the configuration of the network device, whether to send the MAC CE, the SRB, the DRB, or the control PDU in the cell in which the third event occurs.

In addition, if the terminal device has an available uplink transmission resource, and the transmission resource can be used to transmit the MAC CE, a packet assembly process may be performed, and a triggered uplink LBT failure is canceled. The triggered uplink LBT failure includes an uplink LBT failure of one or more cells.

If the terminal device has no available uplink transmission resource, the terminal device may send indication information to the network device, to request the network device to allocate an uplink transmission resource. The indication information may be a reused SR or other indication information.

S1503: The network device determines, based on the fourth indication information, the cell in which the third event occurs.

The process in which the network device determines, based on the fourth indication information, the cell in which the third event occurs is an inverse process of the process in which the terminal device indicates the fourth indication information in step S1502. This is not repeated herein.

Optionally, the network device determines to receive the data not through the uplink grant of the cell in which the third event occurs or the BWP in which the third event occurs.

According to the event processing method provided in this embodiment of this application, the terminal device sends the fourth indication information to the network device, where the fourth indication information is used to indicate the cell in which the third event occurs, and the third event refers to that the quantity of uplink LBT failures reaches the preset maximum quantity of times. Therefore, the network device learns of the cell in which the third event occurs.

It may be understood that, in the foregoing embodiments, methods and/or steps implemented by the terminal device may also be implemented by a component (for example, a chip or a circuit) that can be used in the terminal device, and methods and/or steps implemented by the network device may also be implemented by a component that can be used in the network device.

The foregoing mainly describes the solutions provided in the embodiments of this application from a perspective of interaction between the network elements. Correspondingly, an embodiment of this application further provides a communications apparatus, and the communications apparatus is configured to implement the foregoing methods. The communications apparatus may be the terminal device in the foregoing method embodiments, or an apparatus including the foregoing terminal device, or a chip or a functional module in the terminal device. Alternatively, the communications apparatus may be the network device in the foregoing method embodiments, or an apparatus including the foregoing network device, or a chip or a functional module in the network device. It can be understood that, to implement the foregoing functions, the communications apparatus includes a corresponding hardware structure and/or software module for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communications apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely a logical function division. In actual implementation, another division manner may be used.

Figure 20:
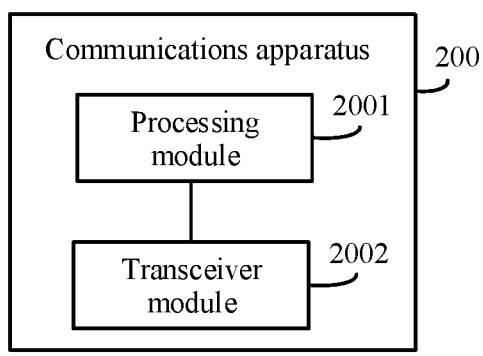
FIG. 20 is a schematic structural diagram 1 of a communications apparatus according to an embodiment of this application.

For example, the communications apparatus is the terminal device in the foregoing method embodiments. FIG. 20 is a schematic structural diagram of a communications apparatus 200. The communications apparatus 200 includes a processing module 2001 and a transceiver module 2002. The communications apparatus 200 may be the terminal device in FIG. 4, FIG. 6, FIG. 13, FIG. 14, and FIG. 15. The processing module 2001 may also be referred to as a processing unit, and is configured to implement a processing function of the terminal device in the foregoing method embodiments. For example, step S601 in FIG. 6, step S1301 in FIG. 13, steps S1401 to S1403 in FIG. 14, and step S1501 in FIG. 15 are performed. The transceiver module 2002 may also be referred to as a transceiver unit, and is configured to implement a transceiver function of the terminal device in the foregoing method embodiments. For example, steps S401 to S404 in FIG. 4, step S602 in FIG. 6, step S1302 in FIG. 13, and step S1502 in FIG. 15 are performed. The transceiver module 2002 may be referred to as a transceiver circuit, a transceiver machine, a transceiver, or a communications interface.

For example, the processing module 2001 is configured to determine first indication information, where the first indication information is used to indicate random access RA triggered by a first event or a second event, the first event refers to that a quantity of transmissions of a scheduling request SR reaches a maximum quantity of transmissions of the SR, and the second event refers to that for an SR that has been triggered and that is in a pending state, there is no available physical uplink control channel PUCCH resource.

The transceiver module 2002 is configured to send the first indication information.

In a possible implementation, the first indication information is indicated by an information element IE or a cause value in a radio resource control RRC message.

In a possible implementation, the first indication information includes second indication information indicating arrival of high-priority data or third indication information indicating arrival of low-priority data, and the second indication information or the third indication information is used to determine the first event or the second event.

In a possible implementation, the first indication information is indicated by a logical channel identifier LCID, a reserved bit, or a payload in a media access control control element MAC CE.

In a possible implementation, when the first indication information is indicated by the LCID, or when the first indication information is indicated by the payload in the MAC CE, the first indication information is further used to indicate that the payload in the MAC CE is a first cell radio network temporary identifier C-RNTI.

In a possible implementation, the first indication information is indicated by a BSR in the RA, and in amounts of to-be-sent data on all logical channel groups in the BSR, when the RA is triggered by the first event, an amount of to-be-sent data on an LCG corresponding to at least one logical channel that has no available PUCCH resource is set to 0; or when the RA is triggered by the second event, an amount of to-be-sent data on an LCG corresponding to at least one LCH that has an available PUCCH resource is set to 0.

In a possible implementation, the first indication information is indicated by different random access channel RACH resources.

In a possible implementation, the first indication information is indicated by uplink control information UCI in a PUCCH resource.

In addition, the processing module 2001 is further configured to determine first indication information, where the first indication information is used to indicate a cell in which a first event occurs, and the first event refers to that a quantity of uplink listen before talk LBT failures reaches a preset maximum quantity of times.

The transceiver module 2002 is further configured to send the first indication information.

In a possible implementation, the transceiver module 2002 is further configured to send second indication information, where the second indication information is used to indicate a bandwidth part BWP in which the first event occurs.

In a possible implementation, the first indication information is indicated by a media access control control element MAC CE.

In a possible implementation, the first indication information is an identifier of the cell in which the first event occurs.

In a possible implementation, the first indication information is a bitmap, and the cell in which the first event occurs corresponds to one bit in the bitmap.

In a possible implementation, the processing module 2001 is further configured to determine to send data not through an uplink grant of the cell in which the first event occurs or the BWP in which the first event occurs.

In addition, the processing module 2001 is further configured to determine a first event, where the first event refers to that a quantity of transmissions of a first scheduling request SR reaches a maximum quantity of transmissions of the SR, and the first SR is carried on a first physical uplink control channel PUCCH resource.

The transceiver module 2002 is further configured to send a second SR on a second PUCCH resource, where a cell to which the second PUCCH resource belongs and a cell to which the first PUCCH resource belongs belong to different timing advance groups TAG, or a cell to which the second PUCCH resource belongs and a primary serving cell belong to different TAGs.

In a possible implementation, the processing module 2001 is further configured to release an uplink resource and/or a configured downlink assignment of at least one serving cell that belongs to a first TAG, where the first TAG is a TAG of the cell to which the first PUCCH resource belongs.

In addition, the processing module 2001 is further configured to determine random access RA triggered by a first event or a second event, where the first event refers to that a quantity of transmissions of a scheduling request SR reaches a maximum quantity of transmissions of the SR, and the second event refers to that for an SR that has been triggered and that is in a pending state, there is no available physical uplink control channel PUCCH resource.

The processing module 2001 is further configured to: when the first event triggers the RA, cancel an SR that triggers the first event and that is in the pending state, and skip releasing uplink resources and/or configured downlink assignments of all serving cells.

The processing module 2001 is further configured to: when the second event triggers the RA, cancel, after the RA is completed, the SR that triggers the second event and that is in the pending state.

In a possible implementation, the processing module 2001 is further configured to: when the first event triggers the RA, release an uplink resource and/or a configured downlink assignment of at least one serving cell that belongs to a first timing advance group TAG, where the first TAG is a TAG of a cell corresponding to a logical channel LCH that triggers the first event.

In this embodiment, the communications apparatus 200 is presented in a form of functional modules obtained through integration. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the communications apparatus 200 may be in a form of the terminal device 105 shown in FIG. 2.

For example, the processor 180 in the terminal device 105 shown in FIG. 2 may invoke the computer-executable instruction stored in the memory 120, so that the terminal device 105 performs a method in the foregoing method embodiments.

Specifically, a function/an implementation process of the processing module 2001 in FIG. 20 may be implemented by the processor 180 in the terminal device 105 shown in FIG. 2 by invoking the computer-executable instruction stored in the memory 120. Alternatively, a function/an implementation process of the transceiver module 2002 in FIG. 20 may be implemented by the RF circuit 110 in the terminal device 105 shown in FIG. 2.

Because the communications apparatus 200 provided in this embodiment may perform the foregoing method, for a technical effect that can be achieved by the communications apparatus 200, refer to the foregoing method embodiments. Details are not described herein again.

Figure 21:
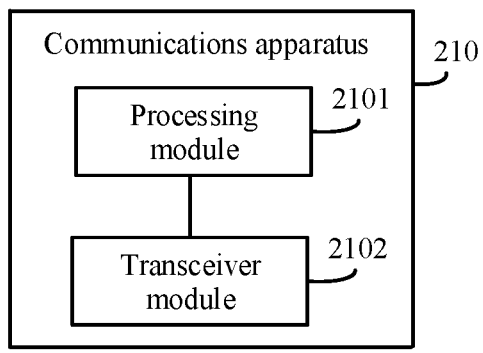
FIG. 21 is a schematic structural diagram 2 of a communications apparatus according to an embodiment of this application.

For example, the communications apparatus is the network device in the foregoing method embodiments. FIG. 21 is a schematic structural diagram of a communications apparatus 210. The communications apparatus 210 includes a processing module 2101 and a transceiver module 2102. The communications apparatus 200 may be the network device in FIG. 4, FIG. 6, FIG. 13, and FIG. 15. The processing module 2101 may also be referred to as a processing unit, and is configured to implement a processing function of the network device in the foregoing method embodiments. For example, step S603 in FIG. 6 and step S1503 in FIG. 15 are performed. The transceiver module 2102 may also be referred to as a transceiver unit, and is configured to implement a transceiver function of the network device in the foregoing method embodiments. For example, steps S401 to S404 in FIG. 4, step S602 in FIG. 6, step S1302 in FIG. 13, and step S1502 in FIG. 15 are performed. The transceiver module 2102 may be referred to as a transceiver circuit, a transceiver machine, a transceiver, or a communications interface.

For example, the transceiver module 2102 is configured to receive first indication information, where the first indication information is used to indicate random access RA triggered by a first event or a second event, the first event refers to that a quantity of transmissions of a scheduling request SR reaches a maximum quantity of transmissions of the SR, and the second event refers to that for an SR that has been triggered and that is in a pending state, there is no available physical uplink control channel PUCCH resource.

The processing module 2101 is configured to determine, based on the first indication information, the RA triggered by the first event or the second event.

In a possible implementation, the first indication information is indicated by an information element IE or a cause value in a radio resource control RRC message.

In a possible implementation, the first indication information includes second indication information indicating arrival of high-priority data or third indication information indicating arrival of low-priority data, and the second indication information or the third indication information is used to determine the first event or the second event.

In a possible implementation, the first indication information is indicated by a logical channel identifier LCID, a reserved bit, or a payload in a media access control control element MAC CE.

In a possible implementation, when the first indication information is indicated by the LCID, or when the first indication information is indicated by the payload in the MAC CE, the first indication information is further used to indicate that the payload in the MAC CE is a first cell radio network temporary identifier C-RNTI.

In a possible implementation, the first indication information is indicated by a BSR in the RA, and in amounts of to-be-sent data on all logical channel groups in the BSR, when the RA is triggered by the first event, an amount of to-be-sent data on an LCG corresponding to at least one logical channel that has no available PUCCH resource is set to 0; or when the RA is triggered by the second event, an amount of to-be-sent data on an LCG corresponding to at least one LCH that has an available PUCCH resource is set to 0.

In a possible implementation, the first indication information is indicated by different random access channel RACH resources.

In a possible implementation, the first indication information is indicated by uplink control information UCI in a PUCCH resource.

In addition, the transceiver module 2102 is further configured to receive first indication information, where the first indication information is used to indicate a cell in which a first event occurs, and the first event refers to that a quantity of uplink listen before talk LBT failures reaches a preset maximum quantity of times.

The processing module 2101 is further configured to determine, based on the first indication information, the cell in which the first event occurs.

In a possible implementation, the transceiver module 2102 is further configured to receive second indication information, where the second indication information is used to indicate a bandwidth part BWP in which the first event occurs.

In a possible implementation, the first indication information is indicated by a media access control control element MAC CE.

In a possible implementation, the first indication information is an identifier of the cell in which the first event occurs.

In a possible implementation, the first indication information is a bitmap, and the cell in which the first event occurs corresponds to one bit in the bitmap.

In a possible implementation, the processing module 2101 is further configured to determine to receive data not through an uplink grant of the cell in which the first event occurs or the BWP in which the first event occurs.

In this embodiment, the communications apparatus 210 is presented in a form of functional modules obtained through integration. The "module" herein may be a specific ASIC, a circuit, a processor and a memory that execute one or more software or firmware programs, an integrated logic circuit, and/or another part that can provide the foregoing functions. In a simple embodiment, a person skilled in the art may figure out that the communications apparatus 210 may be in a form of the network device 300 shown in FIG. 3.

For example, the processor 301 in the network device 300 shown in FIG. 3 may invoke the computer-executable instruction stored in the memory 302, so that the network device 300 performs the method in the foregoing method embodiments.

Specifically, a function/an implementation process of the processing module 2101 in FIG. 21 may be implemented by the processor 321 in the network device 300 shown in FIG. 3 by invoking the computer-executable instruction stored in the memory 322. Alternatively, a function/an implementation process of the transceiver module 2102 in FIG. 21 may be implemented by the RF circuit 310 in the network device 300 shown in FIG. 3.

Because the communications apparatus 210 provided in this embodiment may perform the foregoing method, for a technical effect that can be achieved by the communications apparatus 210, refer to the foregoing method embodiments. Details are not described herein again.

An embodiment of this application further provides a communications apparatus. The communications apparatus includes a processor, a memory, and a transceiver. The processor is coupled to the memory, and when the processor executes a computer program or an instruction in the memory, a method corresponding to the terminal device in FIG. 4, FIG. 6, FIG. 13, FIG. 14, and FIG. 15 is performed.

An embodiment of this application further provides a communications apparatus. The communications apparatus includes a processor, a memory, and a transceiver. The processor is coupled to the memory, and when the processor executes a computer program or an instruction in the memory, a method corresponding to the network device in FIG. 4, FIG. 6, FIG. 13, FIG. 14, and FIG. 15 is performed.

An embodiment of this application further provides a chip. The chip includes a processor and an interface, and is configured to invoke, from a memory, and run a computer program stored in the memory, to perform a method corresponding to the terminal device or the network device in FIG. 4, FIG. 6, FIG. 13, FIG. 14, and FIG. 15.

An embodiment of this application further provides a computer-readable storage medium. The computer-readable storage medium stores an instruction, and when the instruction is run on a computer or a processor, the computer or the processor is enabled to perform a method corresponding to the terminal device or the network device in FIG. 4, FIG. 6, FIG. 13, FIG. 14, and FIG. 15.

An embodiment of this application further provides a computer program product including an instruction. When the instruction is run on a computer or a processor, the computer or the processor is enabled to perform a method corresponding to the terminal device or the network device in FIG. 4, FIG. 6, FIG. 13, FIG. 14, and FIG. 15.

An embodiment of this application provides a chip system. The chip system includes a processor, and is configured to be used by a communications apparatus to perform a method corresponding to the terminal device or the network device in FIG. 4, FIG. 6, FIG. 13, FIG. 14, and FIG. 15.

In a possible design, the chip system further includes a memory. The memory is configured to store a program instruction and data that are necessary for a terminal device. The chip system may include a chip and an integrated circuit, or may include a chip and another discrete device. This is not specifically limited in this embodiment of this application.

The communications apparatus, the chip, the computer storage medium, the computer program product, or the chip system provided in this application is configured to perform the methods provided above. Therefore, for beneficial effects that can be achieved, refer to the beneficial effects in the implementations provided above. Details are not described herein again.

The processor in this embodiment of this application may be a chip. For example, the processor may be a field programmable gate array (FPGA), an application-specific integrated chip (ASIC), a system on chip (SoC), a central processing unit (CPU), a network processor (NP), a digital signal processing circuit (DSP), a micro controller unit (MCU), a programmable controller (PLD), or another integrated chip.

The memory in this embodiment of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory of the systems and methods described in this specification includes but is not limited to these and any memory of another proper type.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms. The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An event processing method, implemented by a terminal device, comprising:
   determining first indication information, wherein the first indication information is used to indicate a bandwidth part (BWP) in a cell in which a first event occurs, and the first event refers to that a quantity of uplink listen before talk (LBT) failures reaches a preset maximum quantity of times, wherein the first indication information comprises a bitmap and a plurality of BWP identifiers, the cell in which the first event occurs corresponds to one bit in the bitmap, and each of the BWP identifier of the plurality of BWP identifiers corresponds to a cell represented by the bitmap;
   switching the BWP in which the first event occurs to an initial BWP, wherein the initial BWP is a BWP that is configured by a network device through a system message and that is used by the terminal device to initiate initial access in an idle state or an inactive state; and
   sending the first indication information to the network device.

2. The method according to claim 1, wherein the first indication information is included in a medium access control (MAC) control element (CE).

3. The method according to claim 1, further comprising:
   determining to send the first indication information using an uplink grant of a cell in which the first event does not occur.

4. The method according to claim 1, further comprising:
   performing a packet assembly process if the terminal device has an available uplink transmission resource.

5. The method according to claim 4, further comprising:
   cancelling triggered uplink LBT failures, wherein the triggered uplink LBT failure includes uplink LBT failure of at least one cell.

6. The method according to claim 1, further comprising:
   sending a scheduling request to the network device if the terminal device has no available uplink transmission resource.

7. An apparatus, wherein the apparatus comprises:
   a memory; and
   one or more processors coupled to the memory, wherein the one or more processors are configured to:
   determine first indication information, wherein the first indication information is used to indicate a bandwidth part (BWP) in a cell in which a first event occurs, and the first event refers to that a quantity of uplink listen before talk (LBT) failures reaches a preset maximum quantity of times, wherein the first indication information comprises a bitmap and a plurality of BWP identifiers, the cell in which the first event occurs corresponds to one bit in the bitmap, and each of the BWP identifier of the plurality of BWP identifiers corresponds to a cell represented by the bitmap;
   switching the BWP in which the first event occurs to an initial BWP, wherein the initial BWP is a BWP that is configured by a network device through a system message and that is used by the terminal device to initiate initial access in an idle state or an inactive state; and
   send the first indication information to the network device.

8. The apparatus according to claim 7, wherein the first indication information is included in a medium access control (MAC) control element (CE).

9. The apparatus according to claim 7, wherein the one or more processors are further configured to:
   determine to send the first indication information using an uplink grant of a cell in which the first event does not occur.

10. The apparatus according to claim 7, wherein the one or more processors are further configured to:
    perform a packet assembly process if there is an available uplink transmission resource.

11. The apparatus according to claim 10, wherein the one or more processors are further configured to:
    cancel triggered uplink LBT failures, wherein the triggered uplink LBT failure includes uplink LBT failure of at least one cell.

12. The apparatus according to claim 7, wherein the one or more processors are further configured to:
    send a scheduling request to the network device if the there is no available uplink transmission resource.

13. An apparatus, wherein the apparatus comprises:
    a memory; and
    one or more processors coupled to the memory, wherein the one or more processors are configured to:
    receive first indication information from a terminal device, wherein the first indication information is used to indicate a bandwidth part (BWP) in a cell in which a first event occurs, and the first event refers to that a quantity of uplink listen before talk (LBT)

failures reaches a preset maximum quantity of times, wherein the BWP in which the first event occurs is switched to an initial BWP by the terminal device, and the initial BWP is a BWP that is configured by a network device through a system message and that is used by the terminal device to initiate initial access in an idle state or an inactive state, and the first indication information comprises a bitmap and a plurality of BWP identifiers, the cell in which the first event occurs corresponds to one bit in the bitmap, and each of the BWP identifier of the plurality of BWP identifiers corresponds to a cell represented by the bitmap; and determine based on the first indication information, the cell in which the first event occurs.

14. The apparatus according to claim 13, wherein the first indication information is included in a medium access control (MAC) control element (CE).

15. The apparatus according to claim 13, wherein the one or more processors are further configured to:
determine to receive the first indication using an uplink grant of a cell in which the first event does not occur.

* * * * *